(12) United States Patent
Nagai

(10) Patent No.: US 9,860,406 B2
(45) Date of Patent: Jan. 2, 2018

(54) PROCESSING APPARATUS

(71) Applicant: SEIKO EPSON CORPORATION, Tokyo (JP)

(72) Inventor: Yoshikazu Nagai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/232,163

(22) Filed: Aug. 9, 2016

(65) Prior Publication Data

US 2017/0054864 A1    Feb. 23, 2017

(30) Foreign Application Priority Data

Aug. 21, 2015 (JP) ................................. 2015-164224

(51) Int. Cl.
*H04N 1/04* (2006.01)
*H04N 1/00* (2006.01)

(52) U.S. Cl.
CPC ..... *H04N 1/00795* (2013.01); *H04N 1/00551* (2013.01); *H04N 1/00588* (2013.01); *H04N 1/00615* (2013.01); *H04N 2201/0094* (2013.01)

(58) Field of Classification Search
CPC .......... H04N 1/00795; H04N 1/00588; H04N 1/00615; H04N 1/00551

USPC ................................ 358/498, 497, 474, 496
See application file for complete search history.

(56) References Cited

U.S. PATENT DOCUMENTS

| | | | |
|---|---|---|---|
| 6,109,806 A | 8/2000 | Asano | |
| 2006/0232820 A1* | 10/2006 | Kasamatsu | ............ G06K 15/00 358/1.16 |
| 2010/0245947 A1* | 9/2010 | Takeuchi | ........... H04N 1/00525 358/498 |
| 2011/0013240 A1* | 1/2011 | Kobayashi | ............... B65H 7/02 358/498 |

FOREIGN PATENT DOCUMENTS

| | | |
|---|---|---|
| JP | 01-294078 A | 11/1989 |
| JP | 05-338867 A | 12/1993 |
| JP | 11-010973 A | 1/1999 |
| JP | 2000-318897 A | 11/2000 |

* cited by examiner

*Primary Examiner* — Houshang Safaipour
(74) *Attorney, Agent, or Firm* — Global IP Counselors, LLP

(57) ABSTRACT

An image reading apparatus includes a pressing member having a pressing portion that is configured to move to a pressing position at an upper portion of a mounting area and to a retracting position away from the upper portion of the mounting area, independently from an edge guide, and presses a sheet.

20 Claims, 10 Drawing Sheets

PROCESSING APPARATUS

CROSS-REFERENCE TO RELATED APPLICATIONS

This application claims priority to Japanese Patent Application No. 2015-164224 filed on Aug. 21, 2015. The entire disclosure of Japanese Patent Application No. 2015-164224 is hereby incorporated herein by reference.

BACKGROUND

Technical Field

The present invention relates to a processing apparatus such as an image reading apparatus and a printing apparatus and relates to a processing apparatus including a medium mounting rack on which a medium such as a document or sheet to be fed for processing is disposed before being fed into an apparatus main body, and an edge guide capable of positioning a feeding position of the medium on the medium mounting rack.

Related Art

In the related art, a processing apparatus such as an image reading apparatus and a printing apparatus is equipped with a medium mounting rack such as a sheet feeding tray or the like in which a medium such as a document or sheet to be subjected to processing such as reading or printing of an image is set in a mounting state before feeding. The medium mounting rack extends from the main body of the processing apparatus obliquely to a rear upper side in use, and a pair of the edge guides capable of being moved in, for example, a width direction intersecting (in particular, orthogonal to) a feeding direction of the medium is provided on a mounting surface thereof. The medium is guided in a state of being sandwiched from both sides by the pair of edge guides, and a feeding position with respect to a feeding port of the main body is adjusted in the width direction. When a processing mechanism in the processing apparatus is driven, a plurality of sheets of the medium set on the medium mounting rack are fed into the main body one by one, and predetermined processing such as image reading processing or printing processing is performed with respect to the fed medium.

Additionally, there is a case where a long-sized medium is used as a processing target other than a short-sized medium such as A4 size or legal size of a standard sheet (cut sheet) in this kind of processing apparatus. The long-sized medium hangs down from an extending direction upper end of the medium mounting rack (end portion on an opposite side to the feeding direction) in a state of being disposed on the medium mounting rack. In this case, since the long-sized medium hangs down while curving in the vicinity of the upper end of the medium mounting rack, the long-sized medium is likely to float from the mounting surface of the medium mounting rack by the curved portion. When the medium is separated from the edge guide so as to no longer be guided due to the floating, a skew that the medium is fed obliquely with respect to the feeding direction is generated.

For example, JP-A-2000-318897 discloses a recording apparatus provided with a continuous-shaped recording medium guide to suppress the floating of a continuous-shaped recording medium on a sheet feeding rack when the recording medium disposed on the sheet feeding rack (medium mounting rack) is continuously supplied to a recording unit inside the apparatus main body by the feeding means. The continuous-shaped recording medium guide is configured to be fixed to a sheet feeder, to be fixed to an exterior of the apparatus main body, or to project in a plate shape so as to overlap a sheet mounting surface by a predetermined width from the upper edge of the right and left sides of the sheet guide (edge guide).

However, when the medium is disposed, the continuous-shaped recording medium guide is an obstacle. Therefore, there is a problem in that the medium is unlikely to be set. For example, when the continuous-shaped recording medium (long-sized medium) is disposed on the mounting surface of the sheet feeding rack, it is necessary to mount the medium by avoiding the continuous-shaped recording medium guide. For example, in a case of the continuous-shaped recording medium guide projecting in a plate shape from the pair of edge guides of which the position can be adjusted in the width direction of the recording medium, the recording medium is disposed after allowing the pair of edge guides to move to an outside position with a slightly wider interval than the width of the recording medium. Then, it is necessary to move the edge guide to the position at which the edge guide comes into contact with the side end of the recording medium. Without being limited to the long-sized medium such as the continuous-shaped recording medium, even in the short-sized medium, there is a case in which the floating is easily generated due to a curl or the like. Regardless of the length of the medium, there is a generally similar problem in a case of the processing apparatus with a configuration in which the medium is set on the medium mounting rack in a state of being guided by the edge guide.

SUMMARY

An advantage of some aspects of the invention is to provide a processing apparatus that can allow a medium to be suitably disposed on a medium mounting rack.

Hereinafter, means of the invention will be described.

According to one aspect of the invention, a processing apparatus includes a medium mounting rack, a processing mechanism, and a guide unit. The medium mounting rack includes a mounting area on which a medium is configured to be disposed. The processing mechanism is configured to perform a processing including transporting of the medium disposed in the mounting area in a transport direction. The guide unit includes an edge guide located at a side of the mounting area in a width direction, and a pressing member including a pressing portion, and configured to move the pressing portion to a pressing position in which the pressing portion overlaps the mounting area as viewed in a perpendicular direction perpendicular to the transport direction and the width direction, and move the pressing portion to a retracting position away from the mounting area, the pressing portion being movable independently from the edge guide.

According to the aspect of the invention, the guide unit includes a first edge guide that is the edge guide, and a second edge guide that is the pressing member located at the side of the mounting area, and the pressing portion is configured to be moved to the pressing position and to the retracting position by a movement of the second edge guide.

According to the aspect of the invention, while the medium with a minimum dimension in the transport direction is disposed on the mounting area, the pressing portion is located at an upstream side relative to an upstream end of the medium with the minimum dimension in the transport direction, and the edge guide is located at a side of the medium with the minimum dimension.

According to the aspect of the invention, while the pressing portion is in the pressing position, the first edge guide and the second edge guide at least partially overlap each other in the width direction in which the first and second edge guides are configured to adjust a width of the mounting area according to a width of the medium.

According to the aspect of the invention, as viewed from the perpendicular direction orthogonal to a surface of the mounting area, the second edge guide while the pressing portion is in the pressing position and the first edge guide at least partially overlap each other in the width direction in which the first and second edge guides are configured to adjust a size of the mounting area.

According to the aspect of the invention, one of the first edge guide and the second edge guide includes an opening, and while the pressing portion of the second edge guide is in the pressing position, the other thereof is at least partially inserted into the opening.

According to the aspect of the invention, the first edge guide and the second edge guide are configured to be opened and closed and move between a closing position to fall into a mounting surface of the medium mounting rack and an opening position to be raised with respect to the mounting surface.

According to the aspect of the invention, the processing apparatus further includes a mechanism configured to interlock movement of the first edge guide and the second edge guide between the closing position and the opening position.

According to the aspect of the invention, the pressing portion is configured to be moved from the pressing position to the retracting position by force received from the medium while the medium is disposed on the medium mounting rack.

According to the aspect of the invention, the processing apparatus further includes a biasing portion configured to bias the pressing portion in a direction toward the pressing position from the retracting position.

According to the aspect of the invention, the pressing portion includes a regulation surface that faces a mounting surface of the medium mounting rack and is configured to regulate floating of the medium from the mounting surface and an inclined surface that is opposite to the regulation surface and is inclined so as to be closer to the mounting surface as approaching to a center of the mounting area.

According to the aspect of the invention, the regulation surface is parallel to the mounting surface of the medium mounting rack, and the inclined surface is a portion which the medium is configured to at least partially come into contact with while the medium is disposed along the edge guide.

According to the aspect of the invention, the pressing portion is located at an upstream side in the transport direction relative to an upstream end of the medium that has a predetermined dimension in the transport direction while the medium is disposed on the recording area, and the edge guide is located at a side of the medium.

According to the aspect of the invention, the medium with the minimum dimension is the medium which has the smallest size in the transport direction among sizes of the medium in the transport direction, which are usable for the processing apparatus.

BRIEF DESCRIPTION OF THE DRAWINGS

Referring now to the attached drawings which form a part of this original disclosure.

DETAILED DESCRIPTION OF EXEMPLARY EMBODIMENTS

First Embodiment

Hereinafter, a first embodiment of an image reading apparatus that is an example of a processing apparatus will be described with reference to the drawings.

Figure 1:
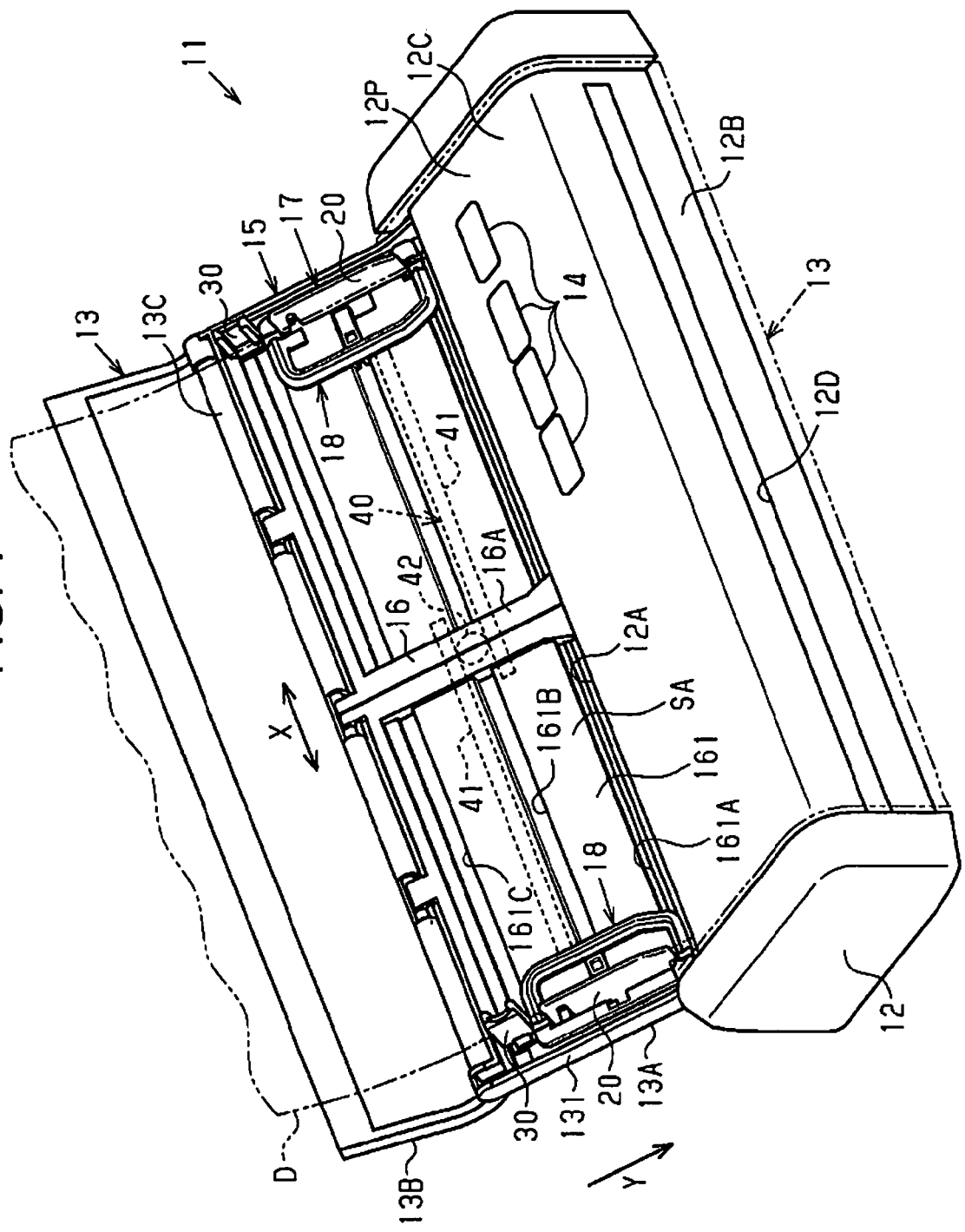
FIG. 1 is a perspective view showing an image reading apparatus according to a first embodiment.

As shown in FIG. 1, an image reading apparatus 11 of the embodiment is provided with a substantially rectangular parallelepiped apparatus main body 12 (hereinafter, referred to as simply "main body 12") and a cover 13 rotatably supported with respect to the main body 12. A plurality of operation units 14 (operation button) operated when an instruction is assigned to the image reading apparatus 11 are disposed in the main body 12. The operation unit 14 includes a power supply unit, an operation unit for the reading instruction operated when the image reading of a document is started, and the like.

As shown in FIG. 1, the image reading apparatus 11 is provided with a document tray 15 in which a document D as an example of a medium as a target of image reading is set in a mounting state. According to the embodiment, an inner surface portion (rear surface portion) when the cover 13 is opened is a mounting surface on which the document is disposed, and the cover 13 is a configuration which also serves as the document tray 15. The main body 12 has a predetermined shape in which a portion covered by the cover 13 closed in a state shown by a two-dot chain line in FIG. 1 is a recessed portion 12C having substantially the same depth as the thickness of the cover 13, and both end portions sandwiching the recessed portion 12C in a longitudinal direction bulge to the slightly outward. An upper surface of the main body 12 serving as a bottom surface of the recessed portion 12C is an operation panel surface 12P where the operation unit 14 is disposed.

The cover 13 is provided with a first cover member 13A of a rectangular plate shape which configures a portion of the base end side thereof and a second cover member 13B of a slightly elongated rectangular plate shape which is rotatably connected to a tip portion of the first cover member 13A via a rotation mechanism 13C (hinge mechanism). In the closed state in which the cover 13 is closed shown by the two-dot chain line in FIG. 1, the first cover member 13A covers the operation panel surface 12P of the upper surface of the main body 12 and the second cover member 13B covers a front surface 12B of the main body 12. In the opened state of the cover 13 shown in FIG. 1, a rotation of the first cover member 13A to an opening side with respect to the main body 12 is regulated at a predetermined angle extending obliquely rearward upper side shown in FIG. 1 and a bending of the rotation mechanism 13C to the opposite side to a bent side when a rotation mechanism 13C closes the cover 13 between the first cover member 13A and the second cover member 13B is regulated. For that reason, the cover 13 is disposed as the document tray 15 extending almost straight to the obliquely rearward upper side with respect to the main body 12 in the opening state shown in FIG. 1.

The document tray 15 is provided with a document mounting rack 16 as an example of the medium mounting rack configured with the first cover member 13A and the second cover member 13B. The document mounting rack 16 is provided with a cover portion 131 including the outer plate member of the cover 13 and a tray portion 161 attached to an upper side (inside) of the cover portion 131 with a predetermined clearance. The upper surface of the document mounting rack 16 is a mounting surface 16A on which a plurality of documents D can be disposed. A guide mechanism 17 capable of positioning a feeding position in the width direction X into a feeding port 12A of the main body 12 for the document D disposed (set) on the mounting surface 16A is disposed on the upper side of the document mounting rack 16. The guide mechanism 17 includes a pair of guide units 18 capable of being slidably moved in the width direction X with respect to the tray portion 161. The pair of guide units 18 is used by adjusting the distance according to the width (size) of the document D set therebetween. A direction intersecting (especially, orthogonal to) a feeding direction Y (transport direction) in which the document D on the document mounting rack 16 is directed toward the feeding port 12A is the width direction X.

The pair of guide units 18 is provided with a pair of edge guides 20 that are located at the sides of a mounting area SA where the document D is actually disposed on the mounting surface 16A of the document mounting rack 16, and can adjust the size of the mounting area SA in the width direction X. The pair of guide units 18 is further provided with a pair of pressing members 30 disposed in the vicinity position of the upstream side of the edge guides 20 in the feeding direction Y. The edge guides 20 and the pressing members 30 configuring the guide unit 18 are slidably guided in the width direction X by a plurality of slit pores 161A to 161C opened in a state of extending along the width direction X in the tray portion 161. The pair of guide units 18 is opposed at a distance in the width direction X, and has a symmetrical configuration with respect to the width center of the document mounting rack 16.

Figure 2:
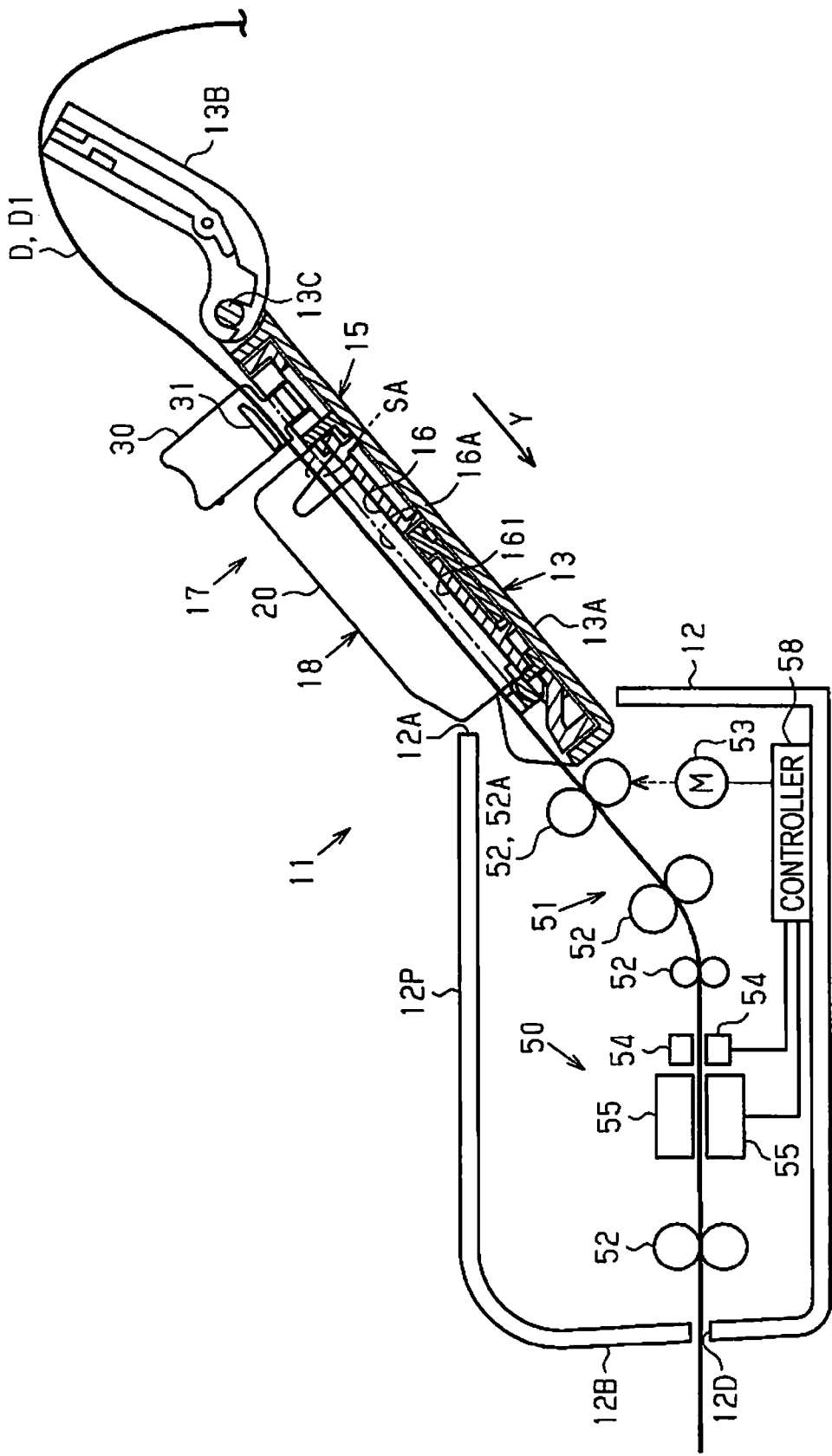
FIG. 2 is a side cross-sectional view schematically showing a portion of the image reading apparatus.
Figure 3:
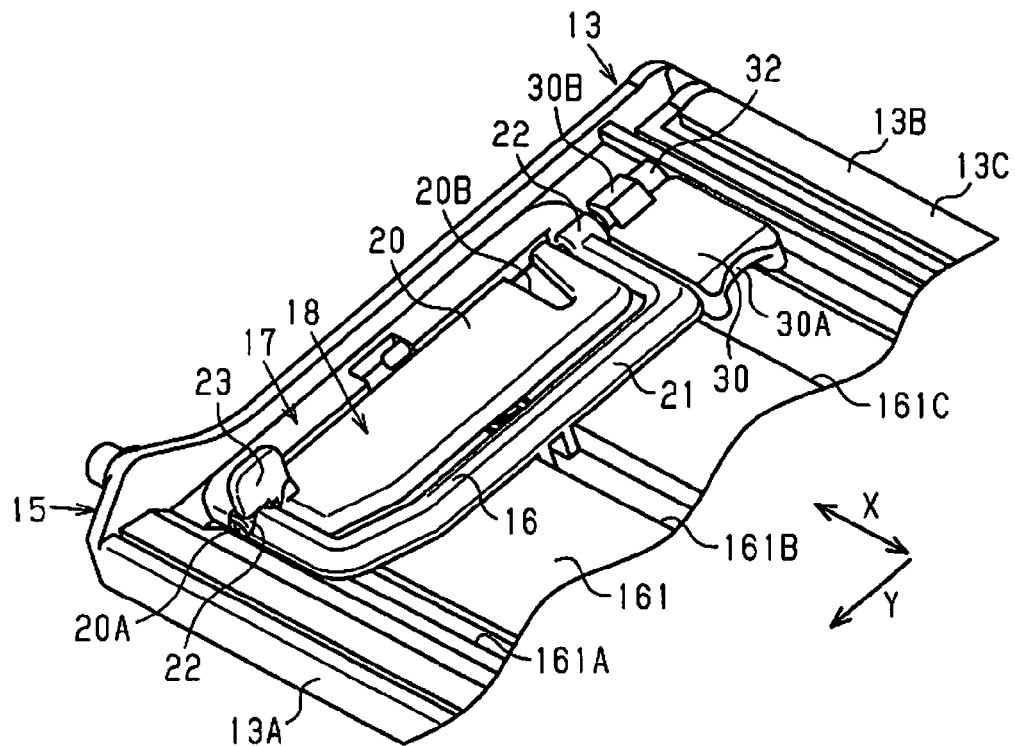
FIG. 3 is a perspective view showing a state in which an edge guide and a pressing member are in a closing position.
Figure 4:
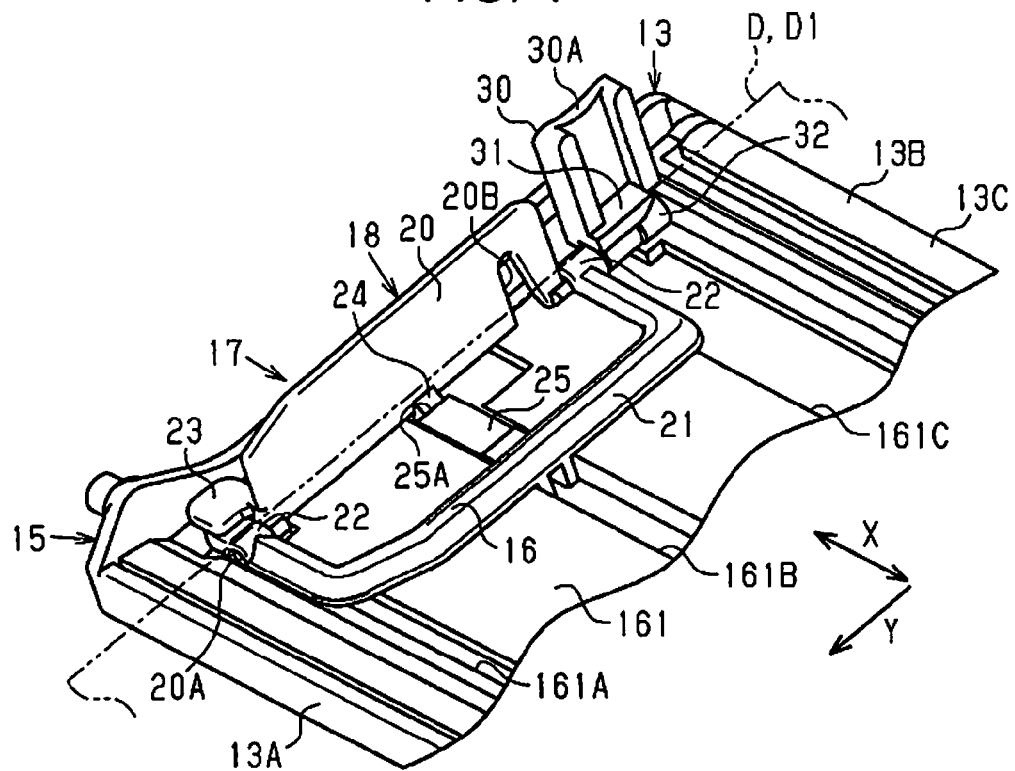
FIG. 4 is a perspective view showing a state in which the edge guide and the pressing member are in an opening position.

The pair of edge guides 20 is positioned to face each other in the width direction X, and defines the feeding position of the document D in the width direction X, by the respective surfaces (guide surfaces) which face each other coming into contact with the side ends on both sides of the document D in the width direction to guide the side ends. The pair of edge guides 20 is rotatably attached at an angle range of substantially 90 degrees about an axis extending parallel in the feeding direction Y. The pair of edge guides 20 can be opened and closed, and can move between an opening position and a closing position. The opening position is a position in which the pair of edge guides 20 is substantially perpendicularly raised with respect to the mounting surface 16A as shown in FIG. 1, FIG. 2 and FIG. 4. The closing position is a position in which the pair of edge guides 20 fall into the mounting surface 16A side of the document mounting rack 16 as shown in FIG. 3. The "mounting area SA" in the embodiment refers to an area in which the document D positioned in the width direction X by the pair of edge guides 20 is disposed on the mounting surface 16A, that is, an area of which the size in the width direction X is adjusted according to the width of the document D by the pair of edge guides 20 and in which the document D is actually disposed. According to the embodiment, when the document D is disposed on the document tray 15, the bottom surface of the document D is supported by a plurality of support portions with a projection shape with respect to the surface of the tray portion 161 configuring the document tray 15. The mounting surface 16A of the embodiment is a virtual plane passing through the plurality of support portions.

The pressing members 30 in tandem with the edge guides 20 are slide-movable in the width direction X, but the pressing member 30s are arranged movably (openable/closable) and independently from the edge guide 20. According to the embodiment, the pressing members 30 are rotatably disposed around the axis parallel in the feeding direction Y, independently from the edge guides 20. The pair of the pressing members 30 located to face each other in the width direction X has a symmetrical configuration with respect to the width center of the document mounting rack 16. The pair of the pressing members 30 can be opened and closed by rotation between a pressing position located in the upper portion of the mounting area SA and a retracting position away from the upper portion of the mounting area SA. As long as the pressing members 30 can move to the pressing position and to the retracting position independently from the edge guides 20, the movement methods thereof may be a linear movement, such as a retractable or sliding movement, without being limited to the rotation.

The guide units 18 are capable of sliding by interlocking with each other around the center position in the width direction X of the document mounting rack 16 as the center. For that reason, the pair of guide units 18 widens or shortens the interval in the width direction X according to the width of the document D. In this manner, the positioning in the width direction X is possible so that the width center of the document D with various sizes is positioned in the same center position.

Specifically, as shown in FIG. 1, the guide units 18 are capable of sliding by interlocking with each other in the width direction X via an interlocking mechanism 40. The interlocking mechanism 40 is provided with a pair of rack portions 41 disposed in a gap space between the cover portion 131 and the tray portion 161 and extending from the pair of guide units 18 in the width direction X, and a common pinion 42 with which a tooth portion of the pair of rack portions 41 is meshed in a different position. When one of the guide units 18 is moved in the width direction X, the pinion 42 which meshes with one of the rack portions 41 thereof rotates, and the other of the rack portions 41 which meshes with the pinion 42 is moved to the opposite side in the width direction X by the rotation of the pinion 42. In this manner, the other of the guide units 18 connected to the other of the rack portions 41 is moved to the opposite side by interlocking with the movement of the other of the rack portions 41. Accordingly, the pair of guide units 18 is moved by interlocking with each other in the direction in which the guide units 18 move to approach to or separate from each other. Thereby, the document D of which the position is adjusted in the width direction X by the pair of edge guides 20 is positioned in the center regardless of the document size normally. In this manner, the edge guides 20 and the pressing members 30 can integrally slide in the width direction X and can be independently and individually opened and closed. The opening/closing of the edge guide 20 and the pressing members 30 are manually performed by the user.

According to the embodiment, as described above, the mounting area of the document D when the side ends on both sides are guided by the pair of edge guides 20 and positioned in the width direction X is the mounting area SA. Accordingly, the mounting area SA changes according to the size of the document D positioned in the width direction X by the pair of edge guides 20.

The image reading apparatus 11 causes the document D of a plurality of types (for example, sheet type) and size (for example, sheet size) to be read. The type of the document D includes plain paper, high quality paper, and cardboard, and the size includes a short-sized sheet such as a business card size, a B5-size, an A4-size, a letter size and a legal size, and a long-sized sheet that is long in one direction. The long-sized document D (D1) such as the long-sized sheet, for example, includes printed matter such as a receipt and a banner sheet.

FIG. 2 is an example in which the long-sized document D1 is set on the document tray 15. The long-sized document D1 has, for example, a length of substantially one meter. Accordingly, as shown in FIG. 2, the long-sized document D1 is set in a state of hanging down from the tip end (upper end) of the document mounting rack 16. Due to the fact that the long-sized document D1 is pulled downward by the weight of the portion hung down in the tip end of the document mounting rack 16, the long-sized document D1 swells upwards so as to form a curved surface in the vicinity of the tip end of the document mounting rack 16. Therefore, a force to be floated is applied to a portion above the mounting surface 16A of the long-sized document D1 by the swelling thereof. However, according to the embodiment, since the floating of the long-sized document D1 is regulated by coming into contact with a pressing portion 31 of each of the pressing members 30, the floating of the long-sized document D1 from the mounting surface 16A is suppressed to less than or equal to a predetermined amount. The predetermined amount of the floating of the document D1 allowed by the pressing members 30 is sufficiently smaller than the height of each of the edge guides 20 in a direction perpendicular to the width direction X and the feeding direction Y, and the document D1 is unlikely to float over the upper end of the edge guides 20.

As shown in FIG. 2, the pressing portion 31 of one of the pressing members 30 for the document floating prevention projects in a position separated by a predetermined gap from the mounting surface 16A shown by a one-dot chain line in FIG. 2 in the inner surface of the one of the pressing member 30s. The floating of the document D is regulated at the position next to the upstream side in the feeding direction Y with respect to the edge guide 20. For this reason, the document D is reliably guided to the edge guide 20 in an edge guide area located in a downstream side, in the feeding direction Y, of a floating prevention area of the document D of which the floating is regulated by the pressing portion 31.

As shown in FIG. 2, an image reading processing mechanism 50 that is an example of a processing mechanism which performs the image reading processing (scan processing) as an example of processing is disposed in the main body 12 of the image reading apparatus 11. The image reading processing mechanism 50 is provided with a transport mechanism 51 that transports the document D. The transport mechanism 51 performs a transport operation of feeding the plurality of sheets of the document D disposed on the document mounting rack 16 one by one into the main body 12 to transport the fed document D along a transport path at a constant transport speed and discharging the document D having the image read in the middle of the transport from a discharge port 12D. The transport mechanism 51 is provided with a plurality of pairs of rollers 52 disposed along the transport path in the main body 12. The plurality of pairs of rollers 52 rotate by the power of a transport motor 53 that is a force source. One of the plurality of the pairs of rollers 52 which is disposed in the most upstream position in the transport direction is a pair of rollers 52A for feeding, including a retard roller. The document D is fed from the feeding port 12A to the main body 12 in order one by one, for example, from the lowest sheet of the plurality of sheets of the document D disposed on the document mounting rack 16 by the rotation of the pair of rollers 52A.

As shown in FIG. 2, a pair of light sources 54 and a pair of the reading units 55 disposed on both sides sandwiching the transport path are disposed in the middle of the transport path in the main body 12. The reading unit 55 is configured with an image sensor extending in a main scanning direction (width direction X). One of the reading units 55 performs the reading operation when reading the one side of the document D, and the pair of the reading units 55 together performs the reading operation when reading both the sides of the documents D. The transport motor 53, the light source 54 and the reading unit 55 are controlled by a controller 58 disposed in the main body 12.

The controller 58 is provided with a transport control unit, a reading control unit, a light source driving unit and an A/D conversion unit none of which neither is shown. When receiving a scan instruction by the operation of the operation unit 14 (refer to FIG. 1) or a communication from a personal computer (PC) (not shown), the controller 58 instructs the driving control unit and the reading control unit to perform the scan operation.

The driving control unit drives the transport motor 53 according to the instruction to rotate the plurality of pairs of rollers 52 so that the plurality of sheets of the document D set on the document mounting rack 16 are fed one by one into the main body 12 and are transported at a constant transport speed along the transport path. The reading control unit controls a light emission of light source 54 via the light source driving unit to irradiate the reading area of the document D with the light. During the transport, the reading control unit, for example, controls the reading unit 55 to read the image of the document D. The analog image signal read by the reading unit 55, for example, is converted into a digital signal in the A/D conversion unit configured with an analog front end IC to input the converted signal to the reading control unit. The reading control unit performs known correction processing such as shading correction and gamma correction on an input digital image signal to generate image data of the document D. The image data is transferred to the PC via a communication cable (not shown) from the controller 58. A transfer destination of the image data may be personal digital assistants (PDA) or a smart device such as a smart phone, without being limited to the PC.

Next, with reference to FIGS. 3 to 5, a detailed configuration of the edge guides 20 and the pressing members 30 will be described. One of the edge guides 20 arranged at left side as viewed in FIG. 1 and the other of the edge guides 20 arranged at a right side as viewed in FIG. 1 are arranged symmetrically relative to a center axis extending along the feeding direction Y of the mounting area SA. Moreover, one of the pressing members 30 arranged at the left side as viewed in FIG. 1 and the other of the pressing members 30 arranged at the right side as viewed in FIG. 1 are arranged symmetrically relative to the center axis of the mounting area SA. Therefore, only the one of the edge guides 20 and the one of the pressing member 30 will be discussed, and the description of the other of the edge guides 20 and the other of the pressing member 30 is omitted for the sake of brevity. It will be apparent to those skilled in the art from this disclosure that the construction of the one of the edge guides 20 and the one of the pressing member 30 as discussed and illustrated herein applies to the construction of the other of the edge guides 20 and the other of the pressing member 30.

As shown in FIGS. 3 and 4, the guide unit 18 is axially supported by a laterally long U-shaped frame portion 21 which surrounds the edge guide 20 when the edge guide 20 has fallen into the closing position on the tray portion 161, and shaft portions 20A projecting from both longitudinal ends of the edge guide 20 into bearing portions 22 disposed on the positions closer to the outside of both ends of the frame portion 21 in the longitudinal direction. In the closing state shown in FIG. 3, an operation lever 23 projects at the upper surface end of the edge guide 20. The user raises the edge guide 20 to the opening state by pressing the operation lever 23 to the outside, for example, with a finger.

As shown in FIG. 4, a locking projection 24 projects in the lower end of a substantially central portion in the width direction on the edge guide 20 in the opening state. A corner portion 25A to which the locking projection 24 can be locked is formed in a supporting portion 25 which extends from the frame portion 21 to the lower side of the tray portion 161. When the edge guide 20 rotates from the closing position to the opening position, the locking projection 24 is locked to the corner portion 25A. Therefore, the edge guide 20 is held in the opening position raised substantially perpendicular with respect to the mounting surface 16A. A recessed portion 20B for assigning flexibility (spring property) to the edge guide 20 is formed at the position closer to end portion of the edge guide 20 in the longitudinal direction. By bending the edge guide 20 to the side narrowing the recessed portion 20B to be deformed, one side of the shaft portions 20A on the side closer to the recessed portion 20B is easily inserted into a pore of one of the bearing portions 22.

As shown in FIGS. 3 and 4, a recessed portion 30A with a curved surface shape is formed at the tip end of the pressing member 30. The user hooks their finger in the recessed portion 30A to perform the opening/closing operation of the pressing member 30. As shown in FIG. 3, a locking projection 30B is disposed on a bottom rear surface of the pressing member 30. In a state where the pressing member 30 is raised to the opening position, the locking projection 30B is locked to the corner portion (not shown). In this manner, the pressing member 30 is held in the opening position.

Figure 6:
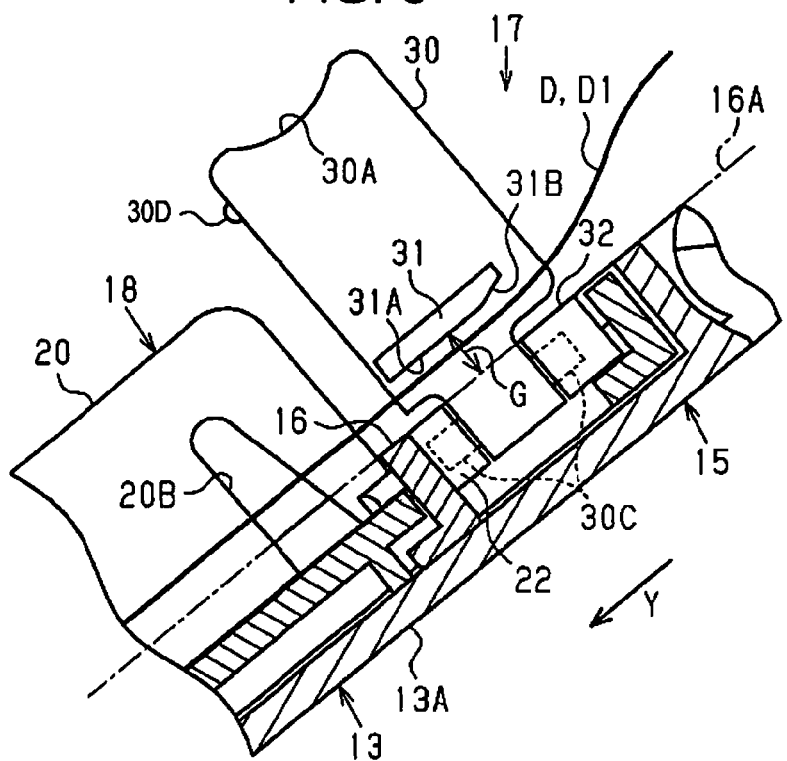
FIG. 6 is a side view showing an action of the pressing member.

As shown further in FIG. 6, the pressing member 30 located next in the feeding direction of the upstream side of the document D with respect to the edge guide 20 can rotate between the closing position tilted to the mounting surface 16A, and the opening position raised with respect to the mounting surface 16A. The pressing member 30 is attached rotatably around an axle 30C which is inserted into a pair of axle bearings 32. The pressing portion 31 projects in a side surface (inner surface) of the pressing member 30, which faces a side surface of the other of the processing member 30 across the mounting area SA in a state of being raised to the opening position of the pressing members 30. The pressing portion 31 is fixed to the side surface of the pressing member 30 to prevent the floating of the document D disposed in the mounting area in the mounting area SA.

Figure 5:
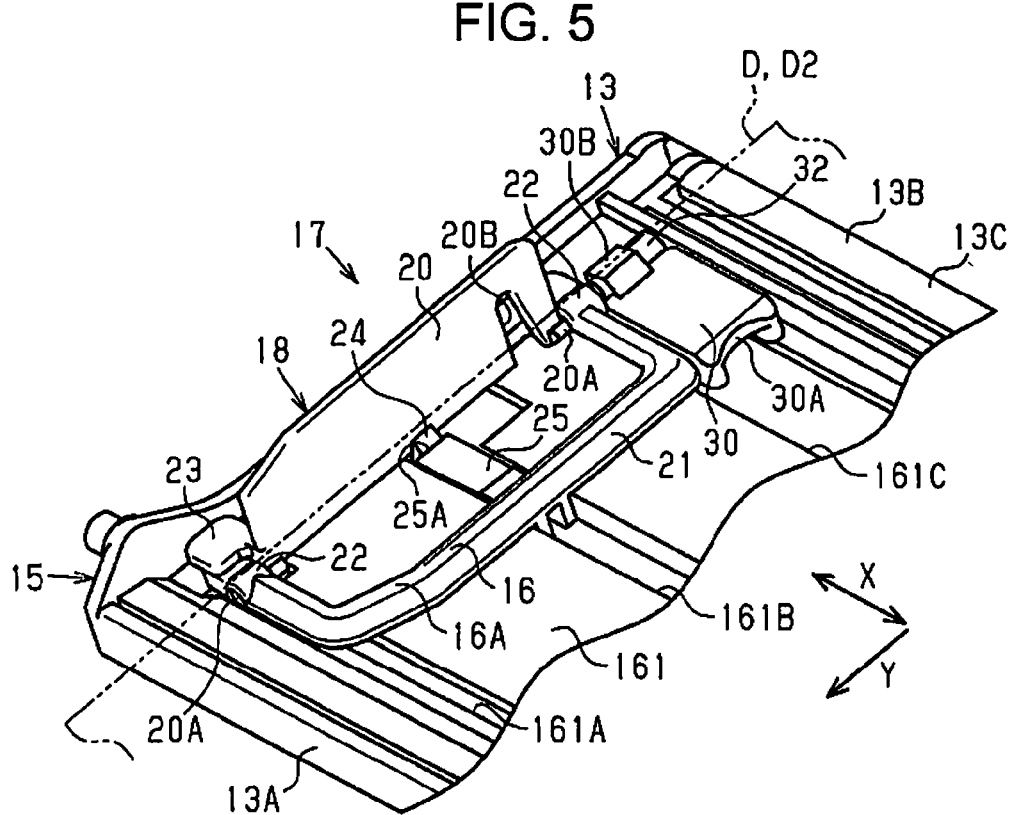
FIG. 5 is a perspective view showing a state in which the edge guide is in the opening position, and the pressing member is in the closing position.

As shown in FIGS. 3 and 5, in a state where the pressing member 30 has fallen into the closing position, the rear surface of the pressing member 30 is disposed at the position at the same height as the mounting surface 16A or a slightly lower height than the mounting surface 16A. The pressing portion 31 retracts to the position lower than the mounting surface 16A, that is, to a position deviated from the upper portion of the mounting area SA. According to the embodiment, in this manner, the lower position of the surface of the mounting area SA (mounting surface 16A) in which the pressing portion 31 is disposed when the pressing member 30 is disposed in the closing position is the retracting position deviated from the upper portion of the mounting area SA. As shown in FIG. 4 and further in FIG. 7, in a state where the pressing member 30 is raised to the opening position, the pressing portion 31 is located at the upper portion of the mounting area SA on which the document D guided by the edge guide 20 is disposed.

As shown in FIG. 6, in a state where the pressing member 30 is raised to be in the opening position, a regulation surface 31A (lower surface) facing the mounting surface 16A of the pressing portion 31 extends parallel to the mounting surface 16A. A portion of the lower surface of the pressing portion 31 at the upstream side of the regulation surface 31A in the feeding direction Y is formed as an inclined surface 31B in which the interval from the mounting surface 16A is widened as it comes closer to the upstream side. The inclined surface 31B allows the documents D to be easily inserted when the user tries to insert the document D from the upstream side in feeding direction Y into the gap between the mounting surface 16A and the regulation surface 31A.

As shown in FIG. 6, a gap G between the pressing portion 31 and the mounting surface 16A is set at the predetermined value. The gap G in the example, for example, is set at the value in which a short-sized document D (D2) including the plain paper can be disposed with a predetermined number of sheets (N sheets (however, N is a natural number of two or more)). Specifically, the gap G is set at the predetermined value obtained by adding the thickness of the predetermined number of sheets (N sheets) of the plain paper and a predetermined distance of the gap which can secure a predetermined gap from the regulation surface 31A in a state where the predetermined number of sheets of the plain paper are disposed. According to the example, the predetermined number of sheets (N sheets) of the plain paper to define the gap G is set at the value within a range from 10 to 50 as the example. More specifically, the gap G is set at the value (A+B) mm (for example, 2.5 mm) obtained by adding a distance for a gap B mm (for example, 0.7 mm) to the total thickness A mm (for example, 1.8 mm) of the maximum number (for example, 20 sheets) of the plain paper that can be scanned. The long-sized document D1 (receipt as the example) can be disposed, for example, up to M sheets (for example, 5 sheets) in the gap G. The predetermined value of the gap G can be changed to the appropriate value as long as the floating in which the document D exceeds the height of the edge guides 20 can be regulated.

The gap G between the pressing portion 31 that regulates the amount of the floating of the document D and the mounting surface 16A is half or less of the height of the edge guide 20 in a direction vertical to the mounting surface 16A. For this reason, the document D for which the amount of the floating is regulated by coming into contact with the regulation surface 31A of the pressing portion 31 does not float beyond the upper end of the edge guide 20 and is in a state normally guided by the edge guide 20.

Figure 7:
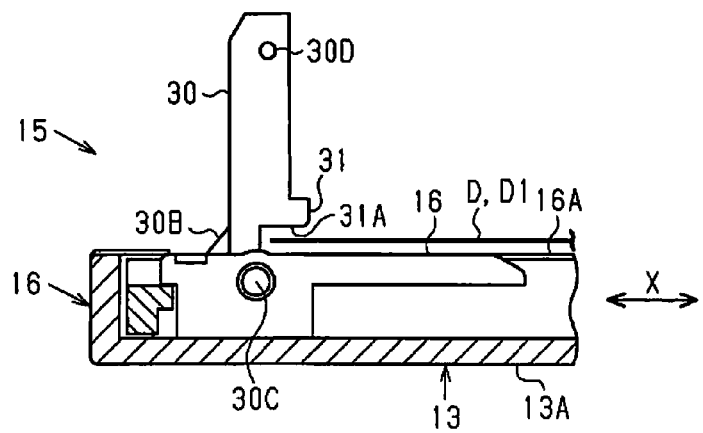
FIG. 7 is a front view showing the action of the pressing member.

As shown in FIGS. 6 and 7, a semispherical projection 30D is formed at the position closer to one side tip end of the pressing member 30. When the pressing member 30 has fallen into the closing position, the projection 30D is engaged with an engaging hole (not shown) which is recessed in the outer surface of the frame portion 21 so that the pressing member 30 is locked in the closing state.

In the image reading processing mechanism 50 of the embodiment, in a state where the document D (document D of business card size in the example (for example, business card)) with the minimum dimension assumed in the transport direction (feeding direction Y) in which the transport is performed is disposed (set) on a mounting area in the mounting area SA in the orientation in which the longitudinal direction thereof coincides with the feeding direction Y, the pressing member 30 is further located at the upstream side of the upstream end of the document D with the minimum dimension. At this time, the edge guide 20 is located at the side of the mounting area SA on which the set document D with the minimum dimension (for example, business card size) is disposed. Accordingly, the document D of the business card size that is the assumed minimum size can be guided by the pair of edge guides 20 and the pressing members 30 are not located at the side of the set document D of the business card in the width direction X. Therefore, even in a state where the pressing member 30 is raised to the opening position, the document D of the business card or the like can be set between the pair of edge guides 20, without the pressing portion 31 being the obstacle.

Next, an action of the image reading apparatus 11 will be described.

The user mounts the document D on the document mounting rack 16 when the user causes the image reading apparatus 11 to read the document D. For example, in a case of causing the long-sized document D1 to be read, the user pushes the operation lever 23 to the outside, for example, with their finger to raise the edge guides 20 to the opening position. The user hooks their finger into the recessed portions 30A to raise the pressing members 30 to the opening position. Thereafter, the user mounts the document D on the mounting surface 16A. The user causes the pair of guide units 18 to slide to the inner side in the width direction to come into contact with the side ends on both sides of the document D in the width direction. Thereby, the feeding position of the document D is positioned in the width direction X. In a state where the same reading of the long-sized document D1 is also performed at a previous time and the position of the pair of edge guides 20 is already adjusted according to the long-sized document D1, the document D1 is disposed after the pair of edge guides 20 is slightly moved to the outside in the width direction X. Then, the pair of edge guides 20 is moved until coming into contact with the side ends of the document D1. Alternatively, the long-sized document D1 is disposed on the mounting surface 16A, while avoiding the end portion thereof in the width direction interfering with the pressing portions 31.

In a state where the long-sized document D1 is disposed in this manner, as shown in FIGS. 6 and 7, the pressing portion 31 of the pressing member 30 is disposed at the pressing position located at the upper portion of the mounting area SA in which the document D1 is disposed on the document mounting rack 16, that is, at the upper portion of the side end of the document D1.

For example, in a case where the image of the long-sized document D1 such as a receipt is read, as shown in FIG. 2, the user mounts the long-sized document D1 disposed on the document mounting rack 16. At this time, the disposed long-sized document D1 is in a state in which the portion of the upstream side of the document D1 in the feeding direction hangs down from the upper end of the document mounting rack 16. The user operates the operation unit 14 to cause the image reading apparatus 11 to start the scan of the document D1. The controller 58 in the image reading apparatus 11, upon receiving the instruction to start scanning, drives the image reading processing mechanism 50. As a result, the documents D1 set on the document tray 15 are fed into the main body 12 one by one to be transported along the transport path by the rotation of each pair of rollers 52. The image of the document D1 is read by the reading unit 55 on the way, and the document D1 after image reading is discharged from the discharge port 12D.

In the image reading process of the document D1, the document D1 hangs while being curved in the vicinity of the upper end of the document mounting rack 16, and the force to be floated in a direction away from the mounting surface 16A is applied to the document D1 by the curve thereof. However, even if the document D1 is about to float, the document D1 comes into contact with the regulation surfaces 31A of the pressing portions 31 for the floating prevention disposed at the pressing position of the upper portion of the mounting area SA, and more floating is regulated. The floating regulation of the document D1 by the pressing portions 31, which is performed at a position in the vicinity on the upstream side of the edge guides 20 in the feeding direction Y, avoids the document D1 from being deviated from the edge guides 20 in an edge guide area of an immediately downstream side thereof. As a result, since the document D1 continues to be guided by the edge guides 20, the skew of the document D1 caused by the document D1 being no longer guided by the edge guide due to the floating of the document is avoided. Therefore, the image of the long-sized document D1 such as the receipt is correctly read by the image reading apparatus 11.

For example, in a case where the short-sized document D2 such as the A4-size and the legal size is read, as shown, in for example, in FIG. 5, the pressing members 30 of the regulation mechanism fall so as to be in the closing position, and only the edge guides 20 are in the state raised to the opening position. Accordingly, when the short-sized document D2 is set, the pressing members 30 which have fallen into the closing position are not the obstacle. Therefore, without caring about the interference of the pressing portions 31, the user can set the document D2 on the document mounting rack 16.

The user operates the operation unit 14 to cause the image reading apparatus 11 to start the scan of the document D.

Then, the documents D set on the document tray 15 are fed into the main body 12 one by one by the driving of the image reading processing mechanism 50. The fed document D is transported along the transport path by the rotation of each pair of rollers 52. The image is read by the reading unit 55 in the middle of the transport thereof, and image data is generated to be output. On the other hand, the document D is discharged from the discharge port 12D after the image reading thereof.

When putting away the image reading apparatus 11, both of the edge guides 20 and the pressing members 30 fall into the closing position and the cover 13 is rotated to the front side. As shown by the two-dot chain line in FIG. 1, the image reading apparatus 11 is closed in the state of covering the upper surface and the front surface of the main body 12.

When the document D with the assumed minimum dimension such as the business card is disposed on the document mounting rack 16, the pressing members 30 are located at the upstream side of the upstream end portion of the document D in the transport direction. Therefore, even if the pressing members 30 are raised to the opening position when the document D such as the business card is read, the document D such as the business card can be set between the edge guides 20, without the pressing portions 31 being the obstacle. For this reason, even if the pressing members 30 are in the opening position when the image of the business card is read, the business card can be set as it is between the edge guides 20, without tilting the pressing members 30.

According to the first embodiment described above, an effect indicated below can be obtained.

(1) The image reading apparatus 11 is provided with the document tray 15 on which the document D is disposed, and the image reading processing mechanism 50 that performs the image reading processing (example of processing) which includes the transport processing in which the documents D disposed on the mounting area SA of the document tray 15 are transported into the main body 12 one by one. The document tray 15 is provided with the document mounting rack 16, the edge guide 20 that is located at the side of the mounting area SA of the document D on the document mounting rack 16, and the pressing member 30 capable of being moved independently from the edge guide 20. By moving the pressing member 30, the pressing portion 31 can be moved to the pressing position at the upper portion of the mounting area SA and the retracting position deviated from the upper portion of the mounting area SA. When the pressing portion 31 is moved to the retracting position deviated from the upper portion of the mounting area SA (position of lower side of mounting surface 16A in the example), the document D can be disposed in the mounting area SA, without the pressing portion 31 being the obstacle. When the document D is disposed on the mounting area SA in a state where the pressing member 30 is raised to the opening position and the pressing portion 31 is in the pressing position at the upper portion of the mounting area SA, even if the document D is about to float, the document D comes into contact with the regulation surface 31A of the pressing portion 31, and more floating is suppressed. Therefore, when the document D is fed from the mounting area SA by the image reading processing mechanism 50, since the document D for which the floating is suppressed up to the position in contact with the pressing portion 31 is fed while correctly and reliably being guided by the edge guide 20, the skew is unlikely to be generated. Accordingly, the image of the document D is read in the correct orientation without the rotational deviation due to the skew by the image reading processing mechanism 50. In this manner, the document D can be preferably disposed in the mounting area SA of the document mounting rack 16.

(2) The pressing member 30 has a configuration in which the user raises the pressing member 30 to the opening position and uses at the time of need. Therefore, in a case where the pressing member 30 is not necessary such as when reading the short-sized document D, the pressing member 30 is folded to the closing position and the pressing portion 31 is moved to the retracting position on the lower side of the mounting surface 16A. Therefore, the pressing member 30 is unlikely to be the obstacle when the document D is disposed on the mounting area SA. In a case where the pressing member 30 is necessary such as when reading the long-sized document D, the pressing member 30 is raised to the opening position and the pressing portion 31 may be in the pressing position. Therefore, although the pressing portion 31 is the obstacle only when necessary, the floating to the extent at which the disposed document D is no longer guided by the edge guide 20 can be suppressed.

(3) In a state where the document D with the minimum dimension in the feeding direction Y is disposed in the mounting area SA when the image reading processing mechanism 50 of the example of the processing mechanism performs the transport, the pressing portion 31 is located at the upstream side of the upstream end portion of the document D with the minimum dimension in the feeding direction Y, and the edge guide 20 is located at the side of the document D with the minimum dimension. Therefore, even if the pressing portion 31 remains so as to be in the pressing position, when the document D with the minimum dimension is disposed, the pressing portion 31 is not the obstacle. That is, without the pressing member 30 being moved to the retracting position, the document D with the minimum dimension can be disposed in a state of being guided by the edge guide 20.

(4) Since the pressing member 30 is disposed in the vicinity of the position that is the upstream side in the feeding direction Y with respect to the edge guide 20, the floating of the document D in the edge guide 20 can be effectively suppressed by the pressing portion 31 of the pressing member 30.

(5) The gap G between the mounting surface 16A and the pressing portion 31 is set at the value of less than half of the height of the edge guide 20 from the mounting surface 16A, specifically, the value obtained by adding a slight gap to the thickness of the assumed maximum number of sheets of the plain paper. Therefore, the floating of the document D in the edge guide 20 can be effectively suppressed by the pressing portion 31 of the pressing member 30.

(6) When one of the pair of guide units 18 is moved, the other thereof interlocks with the one to move by the interlocking mechanism 40. Since both the edge guide 20 and the pressing member 30 are provided on the guide unit 18, it is not necessary for the edge guide 20 and the pressing member 30 to be moved one by one. For that reason, even when the size of document D to be disposed is changed, the user can move the edge guide 20 and the pressing member 30 to the position corresponding to the document size by the common movement operation. Therefore, the positioning work accompanying the change of the position of the guide unit 18 is easily performed.

Second Embodiment

Next, with reference to FIGS. 8 to 11, the second embodiment will be described. The configuration of the guide unit in the second embodiment is different from that of the first embodiment.

Figure 8:
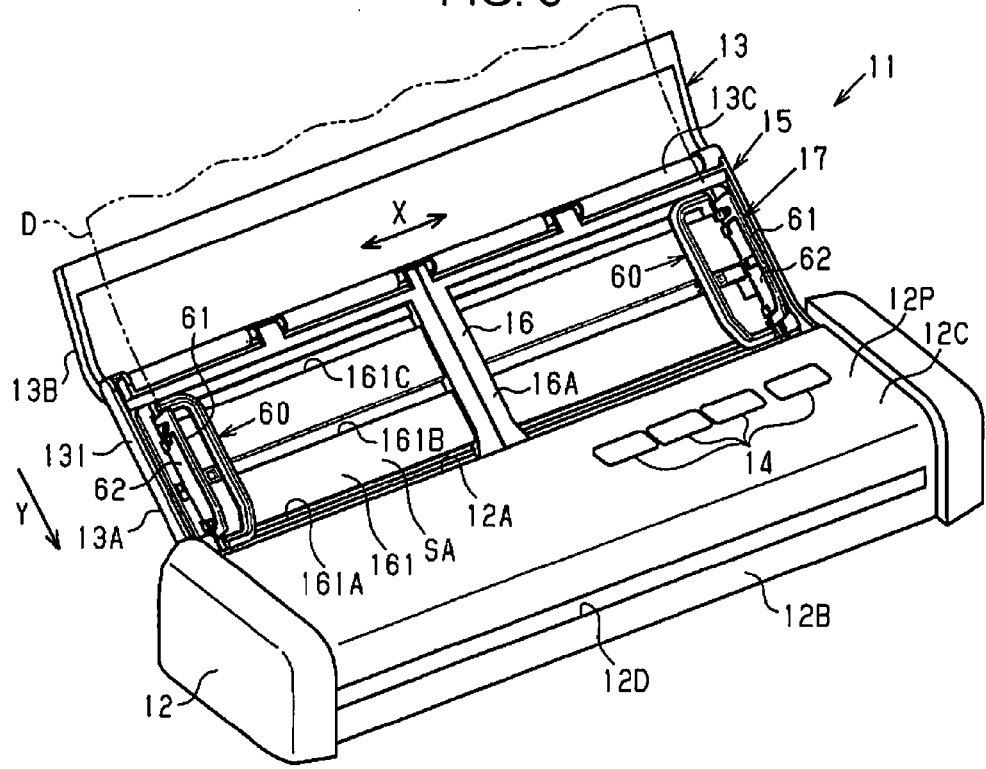
FIG. 8 is a perspective view showing an image reading apparatus according to a second embodiment.

As shown in FIG. 8, the document tray 15 also serving as the cover 13 of the image reading apparatus 11 is provided with the document mounting rack 16 and a pair of guide units 60 that guide the side end on both side in the width direction of the document D disposed on the mounting surface 16A of the document mounting rack 16 and configure a guide mechanism 17 for positioning the feeding position of the document D in the width direction X. The pair of the guide units 60 are slidably (movably) disposed in the width direction X (main scanning direction) via a plurality of slit pores 161A to 161C opened in the tray portion 161 by the interlocking mechanism 40 (refer to FIG. 1) provided on the rear side of the tray portion 161 configuring the document mounting rack 16.

Each of the guide units 60 is provided with a first edge guide 61 and a second edge guide 62. According to the embodiment, the second edge guide 62 also serves as the pressing member. The guide mechanism 17 is provided with the first edge guide 61 that is located at the side of the mounting area SA in which the document D is disposed on the document mounting rack 16, and the second edge guide 62 that is moved to the pressing position of the upper portion of the mounting area SA and to the retracting position deviated from the upper portion of the mounting area SA, independently from the first edge guide 61. The first edge guide 61 and the second edge guide 62 may be opened and closed between the closing position to fall into the mounting surface 16A of the document mounting rack 16, and the opening position raised with respect to the mounting surface 16A.

The similar interlocking mechanism 40 (refer to FIG. 1) as that of the first embodiment to cause the guide units 60 each of which has the first edge guide 61 and the second edge guide 62 to interlock with each other is provided. The interlocking mechanism 40 causes the pair of guide units 60 to interlock with each other and connect the pair of guide units 60 in a slide-movable state. The interlocking mechanism 40, similar as in the first embodiment, is configured with a pair of rack portions 41 disposed on each of the pair of guide units 60 and the common pinion 42 with which the tooth portion of the pair of rack portions 41 is meshed in a different position.

Figure 9:
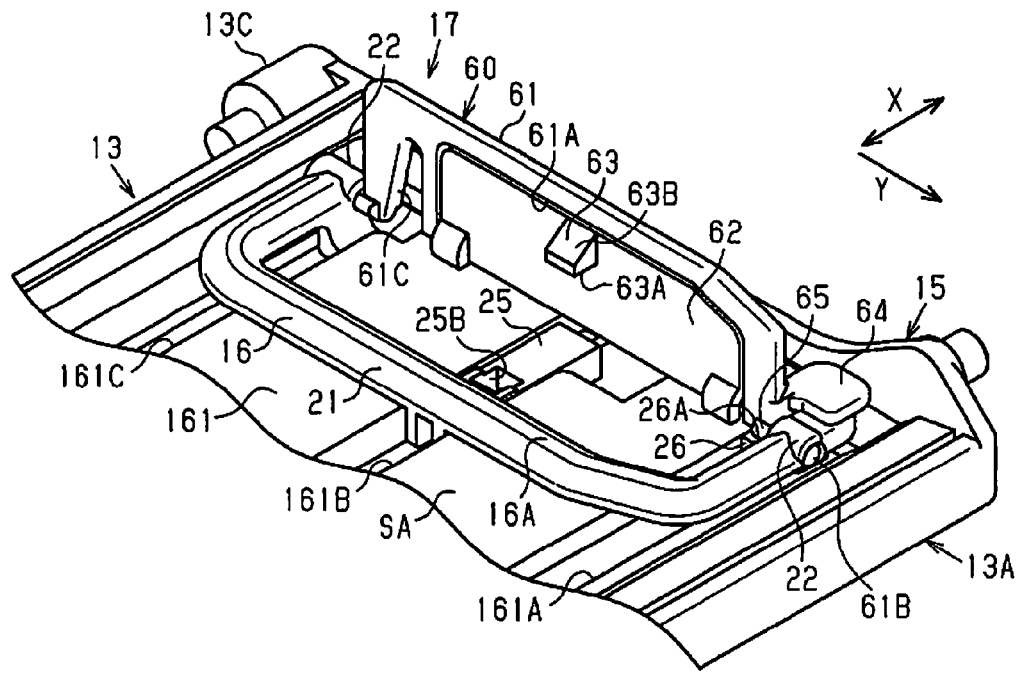
FIG. 9 is a perspective view showing a guide unit that includes a first edge guide and a second edge guide.
Figure 10:
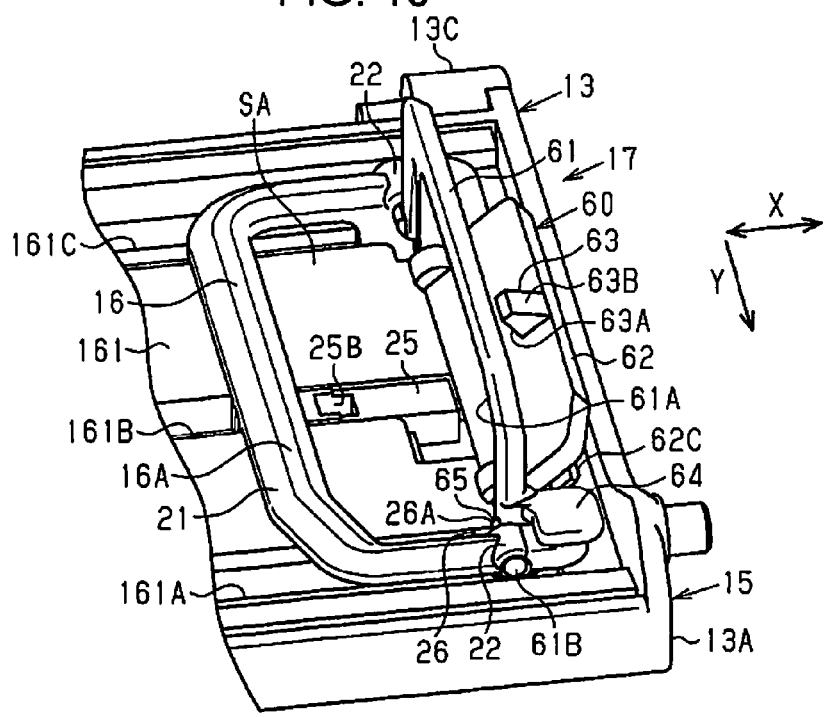
FIG. 10 is a perspective view showing a state in which the second edge guide rotates to a retracting position side in the guide unit.

The pair of guide units 60 will be described. One of the edge guides 60 arranged at left side as viewed in FIG. 8 and the other of the edge guides 20 arranged at a right side as viewed in FIG. 8 are arranged symmetrically relative to a center axis extending along the feeding direction Y of the mounting area SA. Therefore, only the other of the edge guides 60 will be discussed, and the description of the one of the edge guides 60 is omitted for the sake of brevity. It will be apparent to those skilled in the art from this disclosure that the construction of the other of the edge guides 60 as discussed and illustrated herein applies to the construction of the one of the edge guides 60. As shown in FIGS. 9 and 10, the first edge guide 61 is configured with a frame member indicating a laterally long U-shape having the opening 61A formed by the recessed portion. The second edge guide 62 has substantially the same shape and the same size as the opening 61A of the first edge guide 61, and is located at the position corresponding to the opening 61A with respect to the first edge guide 61. According to the embodiment, pressing portions 63 project on the inner surfaces facing each other of the pair of second edge guides 62, respectively, and each of the second edge guides 62 also serves as the pressing member. In the closing position, the pressing portion 63 is fitted into a hole 25B.

The first edge guide 61 has a pair of shaft portions 61B projecting to the outside in the longitudinal direction at both ends in the longitudinal direction. A pair of bearing portions 22 is disposed at the positions that are both ends of the frame portion 21 in the longitudinal direction, similar as in the first embodiment, at the positions corresponding to the pair of the shaft portions 61B of the first edge guide 61. The first edge guide 61 is rotatably disposed with respect to the document mounting rack 16 by inserting the pair of shaft portions 61B into insertion holes of the pair of bearing portions 22. The first edge guide 61 can be opened and closed between the closing position indicated by the two-dot chain line in FIG. 12 and the opening position raised with respect to the mounting surface 16A in FIGS. 9 and 12. A locking projection 65 is formed at the position in the vicinity of at least one of the shaft portions 61B in the first edge guide 61. When the first edge guide 61 is opened to the opening position, the locking projection 65 is locked to a corner portion 26A of a support portion 26 (refer to FIG. 12). Therefore, the first edge guide 61 is held in the raised opening position. If the user tilts manually the first edge guide 61 from the opening position to the closing position, the locking between the locking projection 65 and the corner portion 26A is disengaged in the processing thereof, to be in the closing position. The locking projection (not shown) engages with the corner portion in the closing position. In this manner, the first edge guide 61 is held in the closing position. The first edge guide 61 is disposed with a recessed portion 61C that has the function to assign the flexibility similar to the recessed portion 20B in the first embodiment and an operation lever 64 that has the function similar to the operation lever 23.

Figure 11:
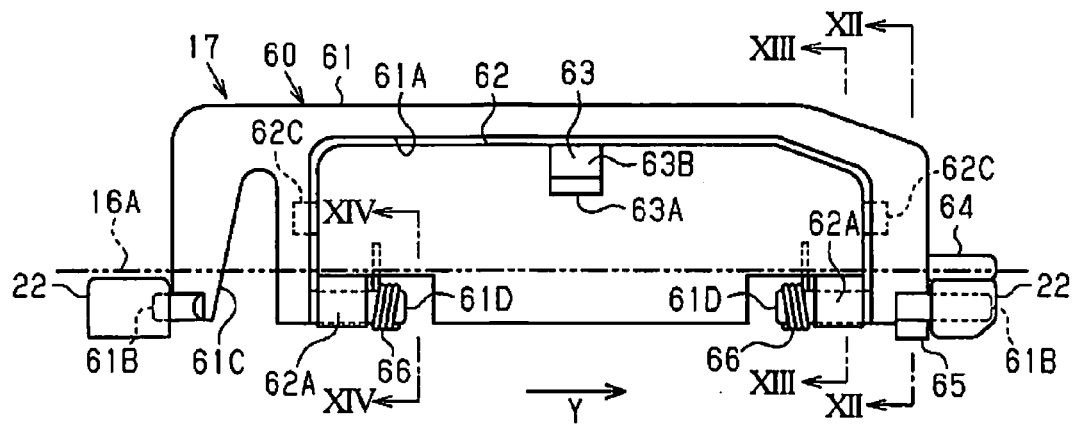
FIG. 11 is a side view showing the guide unit.
Figure 13:
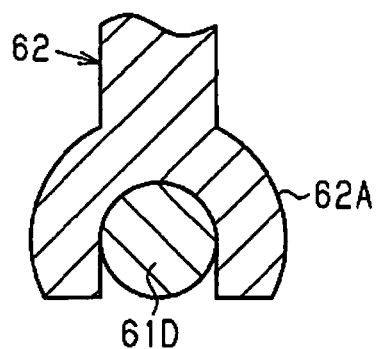
FIG. 13 is a view showing a portion in a cross-section taken along line XIII-XIII in FIG. 11.

As shown in FIGS. 11 and 13, a pair of semi-circular annular engaging portions 62A projects at both ends in the longitudinal direction on the second edge guide 62. As shown in FIG. 11, the pair of engaging portions 62A is fitted with respect to a pair of second shaft portions 61D extending in an inside direction that is opposite to an outside direction, which is the protruding directions of the shaft portions 61B from the both ends in the longitudinal direction of the first edge guide 61 in a rotatable state. Accordingly, the second edge guide 62 can be relatively rotated with respect to the first edge guide 61.

Figure 14:
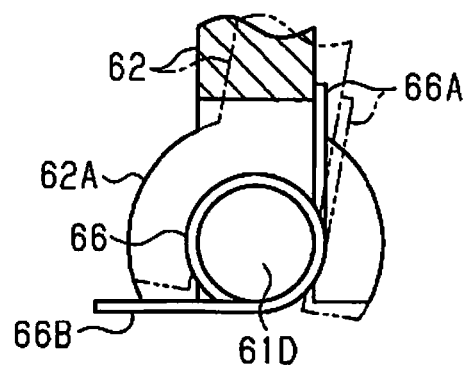
FIG. 14 is a cross-sectional view taken along line XIV-XIV in FIG. 11.

As shown in FIG. 11, a torsion coil springs 66 as an example of a biasing portion hangs and is disposed on a portion of each of the shaft portions 61D projecting to the inside of the first edge guide 61, which is on a side inner than the portion in which the engaging portions 62A are fitted in the axial direction. As shown in FIG. 14, the torsion coil springs 66 are wound in the shaft portions 61D of the first edge guides 61, respectively. One end 66A of each of the torsion coil springs 66 is hooked on the outer surface of the second edge guide 62, and the other end 66B each of the torsion coil springs 66 is hooked on a predetermined portion of the supporting portion 26 disposed on the rear side of the tray portion 161 of the guide unit 60. Accordingly, when the second edge guide 62 is displaced to the outside in the width direction X with respect to the first edge guide 61, the biasing force in the direction closer to the first edge guide 61 from the displaced rotation position thereof is applied.

The second edge guide 62 is disposed at the position corresponding to the opening 61A of the first edge guide 61. A pair of regulation portions 62C projects to the outside in the longitudinal direction at both ends of the second edge guide 62 in the longitudinal direction. For this reason, the second edge guide 62 biased in the direction to move closer to the opening 61A of the first edge guide 61 by the biasing force of the torsion coil spring 66 is held in a state where at least a portion is inserted in the opening 61A by the pair of regulation portions 62C coming into contact with the outer surface of the first edge guide 61.

Figure 12:
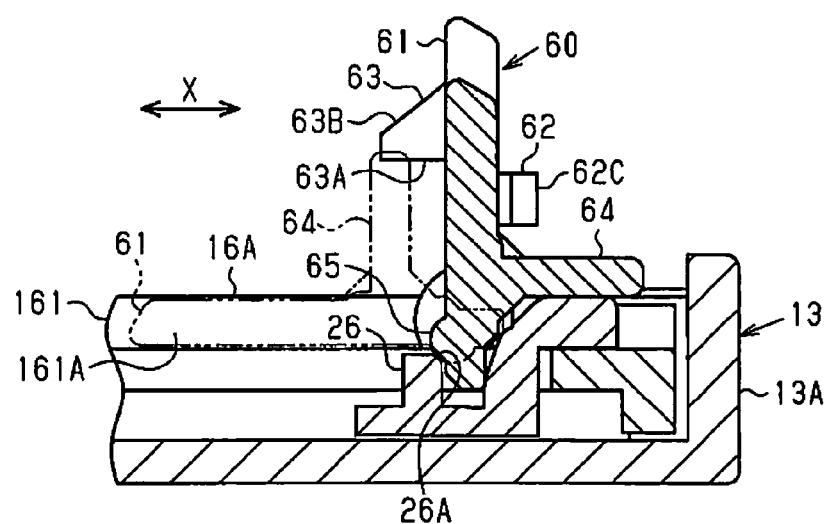
FIG. 12 is a cross-sectional view taken along line XII-XII in FIG. 11.

As shown in FIG. 12, the second edge guide 62 is configured so that the pair of regulation portions 62C comes into contact with the outer surface of the first edge guide 61, in a state where all or a portion of the thickness direction thereof is inserted into the opening 61A (recessed portion) of the first edge guide 61. For this reason, especially in a state where the external force is not applied, the pair of regulation portions 62C comes into contact with the outer surface of the first edge guide 61 in the second edge guide 62, and the first edge guide 61 and the second edge guide 62 are in a state where one thereof entirely or partially overlaps the other in width direction X.

The first edge guide 61 and the second edge guide 62 are provided in a double structure so as to at least partially overlap each other in a direction (width direction X) intersecting the transport direction (feeding direction Y) in which the document D on the document mounting rack 16 is transported, in the opening position state. Accordingly, when being viewed from a direction perpendicular to the surface of the mounting area SA, the first edge guide 61 and the second edge guide 62 at least partially overlap each other in the width direction, in the opening position state.

In a case where the edge guide is set to be the first edge guide 61, the second edge guide 62 is further provided at the side of the mounting area SA, and the second edge guide 62 includes the pressing portion 63. By the movement of the second edge guide 62, the pressing portion 63 is moved between the pressing position and the retracting position.

As shown in FIGS. 9 to 12, when the guide unit 60 is in the opening state, the surface facing the mounting surface 16A of the pressing portion 63 (or upper surface of tray portion 161) is a regulation surface 63A that extends substantially parallel to the mounting surface 16A and regulates the floating of the document D. The surface on the side opposite to the regulation surface 63A of the pressing portion 63 is an inclined surface 63B inclined in the orientation closer to the mounting surface 16A as moving closer to the central portion in the width direction X of the mounting area SA. In other words, the pressing portion 63 receives the force in the direction (direction closer to mounting surface 16A) in which the document D is set when the document D is disposed on the document mounting rack 16. Therefore, the second edge guide 62 as the example of the pressing member is displaced to the outside in the width direction with respect to the first edge guide 61 and the pressing portion 63 is moved from the pressing position to the retracting position.

When the document D to be read is disposed on the document mounting rack 16, in the process of moving the document D along the inclined surfaces 63B of the pressing portions 63 to the mounting surface 16A side, the side end portion of the document D pushes the pressing portions 63 via the inclined surfaces 63B to the outside. The second edge guides 62 are rotated to the outside against the biasing force of the torsion coil springs 66 according to the pushing force, so that the pair of pressing portions 63 escapes to the outside in the width direction X.

In this manner, each of the guide units 60 includes the first edge guide 61 located at the side of the mounting area SA in which the document D is disposed on the document mounting rack 16, and the second edge guide 62 movable between the pressing position where the pressing portion 63 is located at the upper portion of the mounting area SA and the retracting position where the pressing portion 63 does not locate at the mounting area SA. The mechanism for interlocking the opening/closing of both of the edge guides 61 and 62 is configured by the torsion coil springs 66 and the regulation portions 62C or the like for biasing the second edge, guide 62 up to the position which is partially inserted into the opening 61A of the first edge guide 61. Accordingly, by operating the operation lever 64 projecting on the first edge guide, the first edge guide 61 and the second edge guide 62 interlock each other to move between the closing position and the opening position.

Meanwhile, when the user mounts the document D on the document mounting rack 16, the document D is moved along the inclined surfaces 63B of the pressing portions 63, and the pressing portions 63 are pressed to the outside via the inclined surfaces 63B as moving closer to the mounting surface 16A. As a result, each of the second edge guide 62 having the pressing portion 63 rotates to the outside against the biasing force of the torsion coil springs 66, and the pressing portion 63 retracts to the outside. As a result, even if the pressing portion 63 is located at the upper portion of the mounting area SA, the pressing portion 63 is not the obstacle. Therefore, the user can mount the document D on the mounting surface 16A.

Accordingly, the long-sized document D1 and the short-sized document D2 can be easily disposed. Moreover, the floating of the document D can be prevented by the regulation surface 63A of the pressing portion 63. As a result, the skew due to the floating of the long-sized document D1 can be prevented. Therefore, the image of the document D can be read in the correct orientation without a rotational deviation by the image reading apparatus 11. Although the second edge guide 62 is disposed so that the pressing portion 63 is located at the upstream side of the upstream end in the feeding direction Y of the document D with the minimum dimension (for example, business card) when the document D with the minimum dimension such as the business card is set in the second embodiment, it is not necessary to limit the disposition position of the second edge guide 62 which is the example of the pressing member in this manner.

According to the second embodiment described above, in addition to similarly obtaining the effect of the same kind as above-described (1) to (6) described in the first embodiment, the following effect can be further obtained.

(7) When the document D is disposed, since the pressing portion 63 is retracted to the retracting position on the outer side of the width direction X against the biasing force of the torsion coil springs 66, the short-sized document D and the long-sized document D also can be easily disposed. For example, according to the first embodiment, since the configuration is adopted in which the pressing member 30 is raised to the opening position for the long-sized document D1 and the pressing member 30 is tilted to the closing position for the short-sized document D2, the opening/closing operation of the pressing member 30 is performed by the user in accordance with the type the document D with a short-sized sheet or a long-sized sheet. However, according to the second embodiment, since the document D may be disposed between the pair of guide units 60 of which the position is adjusted in the width direction X according to the width of the document D at that time, regardless of the type the document D being a short-sized sheet or a long-sized sheet, the operation that the user sets the document D on the document mounting rack 16 is easily performed.

(8) The first edge guide 61 at the side of the mounting area SA and the second edge guide 62 at the side of the mounting area SA are further provided. The second edge guide 62 includes the pressing portion 63, and the pressing portion 63 is moved to the pressing position and the retracting position by the movement of the second edge guide 62. Therefore, by the second edge guide 62 including the pressing portion 63 performing the relative movement (relative rotation) with respect to the first edge guide 61, the pressing portion 63 is moved between the pressing position and the retracting position. The document D is guided in the width direction X and the transport position thereof can be positioned by the first edge guide 61 and the second edge guide 62 located at the pressing position. Moreover, the floating of the document D can be prevented.

(9) The first edge guide 61 and the second edge guide 62 in the state where the pressing portion 63 is disposed in the pressing position at least partially overlap each other in the width direction X intersecting the feeding direction Y of the document D in the mounting area SA. Therefore, the first edge guide 61 and a second edge guide 62 can be configured as a relatively thin type. For example, when the cover 13 is closed and the first edge guide 61 and the second edge guide 62 are disposed at the closing position, both of the first and second edge guides 61 and 62 can be thinly folded. Therefore, the thickness of the cover 13 covering the upper surface and the front surface of the main body 12 can be the thin type, and can further contribute to reduce the size of the image reading apparatus 11.

(10) A configuration is adopted in which in a position state where the pressing portion 63 is in the pressing position, the first edge guide 61 and the second edge guide 62 at least partially overlap each other in the direction to adjust the width of the mounting area SA, when being viewed from the direction perpendicular to the surface of the mounting area SA. Therefore, in spite of having two of the first and second edge guides 61 and 62, the first edge guide 61 and the second edge guide 62 can be configured as the relatively thin type. For example, when the cover 13 is closed and the first edge guide 61 and the second edge guide 62 are disposed at the closing position, both of the first and second edge guides 61 and 62 can be thinly folded. Therefore, the thickness of the cover 13 covering the upper surface and the front surface of the main body 12 can be the thin type, and can further contribute to reduce the size of the image reading apparatus 11.

(11) In a state where the opening 61A is formed in the first edge guide 61, and the second edge guide 62 is moved to the position in which the pressing portion 63 is in the pressing position, a portion of the second edge guide 62 is inserted into the opening 61A. Therefore, the first edge guide 61 and the second edge guide 62 can be configured as the relatively thin type. For example, since the first edge guide 61 and the second edge guide 62 can be configured to be thin when folded in a closing position, the thickness of the cover 13 covering the upper surface and the front surface of the main body 12 can be thin, and can further contribute to reduce the size of the image reading apparatus 11.

(12) The first edge guide 61 and the second edge guide 62 can be opened and closed between the closing position to fall into the mounting surface 16A of the document mounting rack 16, and the opening position raised with respect to the mounting surface 16A. Therefore, in use, the first and second edge guides 61 and 62 can be positioned in the width direction X while pressing the floating of the document D by being in the opening position raised from the mounting surface 16A. In no use, the first and second edge guides 61 and 62 can be compactly accommodated by tilting the first and second edge guides 61 and 62 to the closing position.

(13) The guide units 60 each of which includes the first edge guide 61 and the second edge guide 62 interlock each other by the interlocking mechanism 40. Therefore, since it is not necessary to operate the first edge guide 61 and the second edge guide 62 one by one, the positioning work of the document D is easily performed.

(14) As long as an external force is not applied, the second edge guide 62 abuts against the first edge guide 61 by the torsion coil springs 66 in a state of being biased in the orientation coming into contact with the first edge guide 61. Therefore, when the operation lever 64 of the first edge guide 61 is operated, the movement (for example, rotation) between the closing position and the opening position of the first edge guide 61 and the second edge guide 62 can be interlocked each other by the mechanism including the torsion coil spring 66, the regulation portion 62C, and the like. In this manner, since the first edge guide 61 and the second edge guide 62 may not be opened and closed separately, the positioning work of the document D is easily performed.

(15) The torsion coil springs 66 as an example of a biasing portion for biasing the second edge guide 62 in the direction in which the pressing portion 63 is directed from the retracting position to the pressing position are provided. Therefore, the pressing portion 63 moved from the pressing position to the retracting position by the force received from the document D disposed on the document mounting rack 16 is moved to the pressing position regulating the floating of the document D from the retracting position by the biasing force of the torsion coil springs 66, when the mounting of the document D is completed. For this reason, it is not necessary for the user to perform the operation to move the pressing portion 63 from the pressing position to the retracting position and the operation to return the pressing portion 63 from the retracting position to the pressing position at the time of mounting the document D. Therefore, the operation for mounting the document D is easily performed.

(16) In the pressing portion 63, the surface facing the mounting surface 16A of the document mounting rack 16 is the regulation surface 63A regulating the floating of the document D from the mounting surface 16A, and the surface on the side opposite to the regulation surface 63A is the inclined surface 63B inclined in the orientation closer to the mounting surface 16A as moving closer to the center of the mounting area SA. Therefore, when the document D is disposed along the first and second edge guides 61 and 62, the document D comes into contact with the inclined surface 63B of the pressing portion 63, and the pressing portion 63 retracts from the pressing position to the retracting position by the force that the inclined surface 63B receives from the document D. Therefore, when the document D is disposed on the document mounting rack 16, the pressing portion 63 is not the obstacle.

(17) In the pressing portion 63, the regulation surface 63A is the surface parallel to the mounting surface 16A of the document mounting rack 16, and at least a portion of the position that the document D at the time of being disposed along the edge guides 61 and 62 comes into contact with the pressing portion 63 is the inclined surface 63B. Therefore, the pressing portion 63 retracts from the pressing position to the retracting position by the force received from the document D at the time of being disposed along the edge guide via the inclined surface 63B. Therefore, when the document D is disposed on the document mounting rack 16, the pressing portion 63 is not the obstacle.

Third Embodiment

Next, a third embodiment will be described with reference to FIGS. 15 and 16. The present embodiment is an example of reversing the position relationship of the first edge guide and the second edge guide having the pressing portion with respect to the configuration of the second embodiment. The configuration except for the guide mechanism 17 is the same as the above-described first embodiment.

Figure 15:
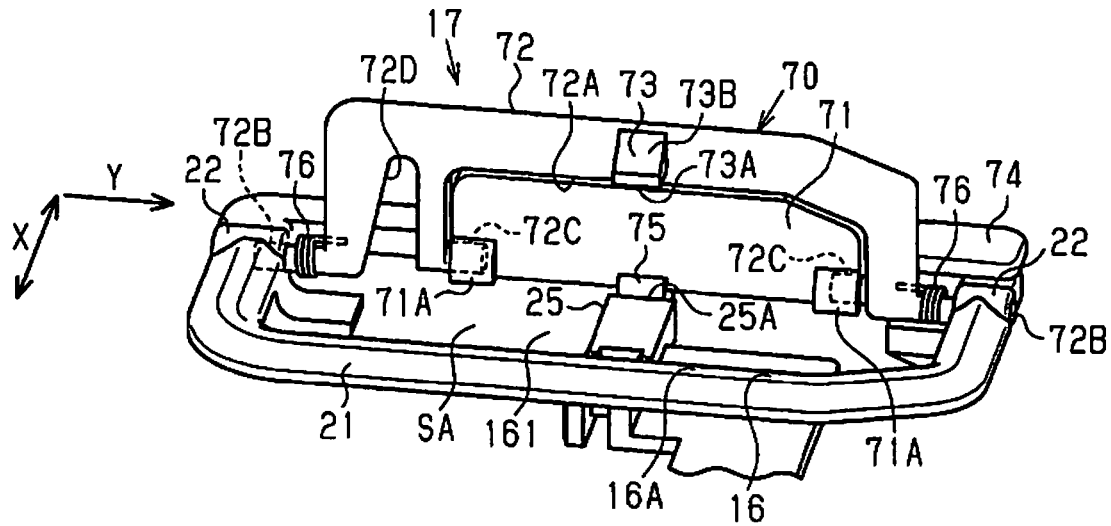
FIG. 15 is a perspective view showing a guide unit that includes a first edge guide and a second edge guide according to a third embodiment.
Figure 16:
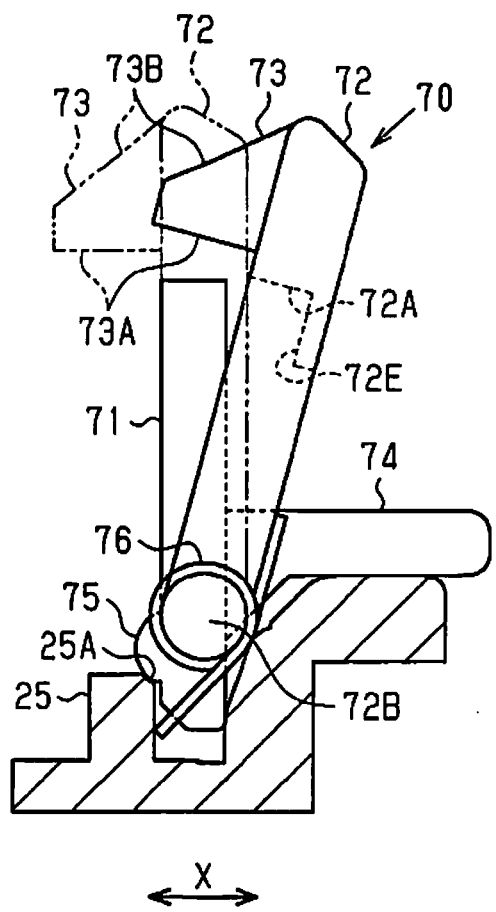
FIG. 16 is a rear view showing the guide unit in a state in which the second edge guide retracts.

As shown in FIGS. 15 and 16, each of a pair of guide units 70 (shown only one in drawings) configuring the guide mechanism 17 is provided with a first edge guide 71 rotatable in a state of being biased in one direction by the torsion coil springs 76, and a second edge guide 72 which forms the laterally long U-shape having an opening 72A of substantially the same shape and same size as the first edge guide 71. Shaft portions 72B projecting from both ends in the longitudinal direction to the outside in the axial direction are inserted into the pair of bearing portions 22. Therefore, the second edge guide 72 is provided so as to be rotated around the shaft portions 72B.

A pair of semicircular annular engaging portions 71A projecting from the rotation base end side of both ends of the first edge guide 71 in the longitudinal direction is fitted with respect to shaft portions 72C, which project to the opposite directions (inside) to the projecting directions of the shaft portions 72B coaxially with the shaft portion 72B, respectively. Thus, the first edge guide 71 is provided so as to be relatively rotated with respect to the shaft portions 72C of the second edge guide 72 at the position corresponding to the opening 72A of the second edge guide 72. In a state where the first edge guide 71 is in the opening position raised from the mounting surface 16A (or surface of tray portion 161), a locking projection 75 projecting from the center in the longitudinal direction on the rotation base end side of the first edge guide 71 is locked to a corner portion 25A of the supporting portion 25. In this manner, the first edge guide 71 is held at the opening position.

In the second edge guide 72 having the pressing portion 73, the first edge guide 71 in the thickness direction is entirely or partially inserted into the opening 72A, at a position shown by the two-dot chain line in FIG. 16, where a regulation wall 72E formed on at least a portion of the inner peripheral edge of the opening 72A comes into contact with the outer surface of the first edge guide 71. Accordingly, in the opening position in which the external force is not applied, one of the first edge guide 71 and the second edge guide 72 overlaps all or a portion of the other thereof in the width direction X. An operation lever 74 projects in the first edge guide 71, and a recessed portion 72D to assign the flexibility (spring property) is formed in the second edge guide 72.

In the pressing portion 73, the surface facing the mounting surface 16A (or surface of tray portion 161) is a regulation surface 73A, and the surface on the side opposite to the regulation surface 73A is an inclined surface 73B inclined in the orientation closer to the mounting surface 16A as moving closer to the central side in the width direction X of the mounting area SA. In this manner, the disposition relationship between the first and second edge guides 71 and 72 is reversed in and out with respect to the second embodiment. Even in the guide unit 70 in which the first edge guide 71 is disposed inside and the second edge guide 72 having the pressing portion 73 is disposed outside, the effect of the same kind as the effect of above-described (7) to (17) obtained by the above-described second embodiment can be obtained.

Fourth Embodiment

Next, the fourth embodiment will be described with reference to FIG. 17 and FIG. 18. The embodiment is an example in which the pressing portion is configured to project and to be retracted with respect to the edge guide. The configuration except for the guide mechanism 17 is the same as the above-described first embodiment.

Figure 17:
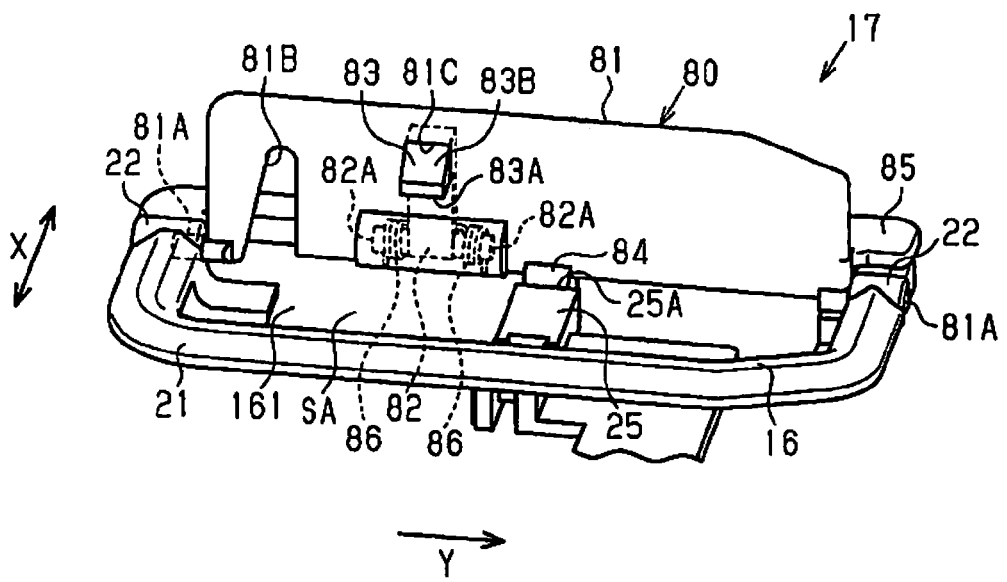
FIG. 17 is a perspective view showing a guide unit according to a fourth embodiment.
Figure 18:
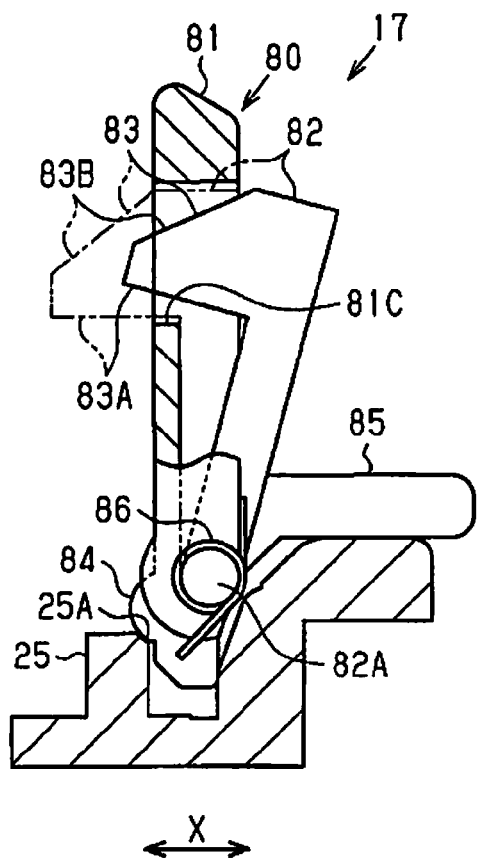
FIG. 18 is a rear view showing a rotation biasing structure of the pressing member in the guide unit.

As shown in FIGS. 17 and 18, each of a pair of guide units 80 (shown only one in drawings) configuring the guide mechanism 17 is provided with an edge guide 81 rotatable about a pair of shaft portions 81A which is inserted into the bearing portions 22 and a pressing member 82 rotatable about a shaft portion 82A in a state of being biased in one direction to move closer the edge guide 81 by torsion coil springs 86. A pressing portion 83 projects and can be retracted from an opening 81C formed in the position corresponding to the pressing portion 83 of the edge guide 81. In the pressing portion 83 projecting from the edge guide 81, the surface facing the mounting surface 16A (or surface of tray portion 161) is a regulation surface 83A, and the surface on the opposite side of the regulation surface 83A is an inclined surface 83B inclined in the orientation closer to the mounting surface 16A as moving closer to the central side in the width direction X of the mounting area SA.

The position in which the pressing portion 83 projects and retracts with respect to the edge guide 81 is disposed at the upstream side of the center position of the edge guide 81 in the feeding direction Y. Accordingly, the floating of the document D can be prevented in the position closer to the upstream side of the edge guide 81 in the feeding direction Y. A recessed portion 81B and an operation lever 85 are provided in the edge guide 81.

A locking projection 84 is locked to the corner portion 25A of the supporting portion 25. In this manner, the edge guide 81 is held in the opening position when the edge guide 81 is opened. The operation lever 85 projects in the edge guide 81. In this manner, even in a case where the pressing portion 83 is configured to project and to be retracted with respect to the edge guide 81, the pressing portion 83 retracts when the document is disposed, and the floating deviated from the edge guide 81 of the document is prevented. Therefore, it is possible to prevent the skew of the document resulting from the type of floating. Therefore, the same effect as in the second embodiment can be obtained, for example, the image of the document can be read in the correct orientation without the rotational deviation due to the skew.

Each of the above-described embodiments may be modified in the following forms.

In the above-described first embodiment, the pressing member for preventing the floating may be provided in both positions of the upstream side and the downstream side in the feeding direction Y with respect to one of the edge guides 20.

In the above-described first embodiment, the pressing member may be provided rotatably in the biased state in the direction to return to the opening position when the pressing member is displaced to the outside in the width direction X by the biasing portion such as a torsion coil spring, and may be configured such that the same inclined surface as that of the pressing portion in the above-described second to fourth embodiments is formed on the surface on a side opposite to the regulation surface of the pressing portion. According to the configuration, the pressing portion is not the obstacle when the document D is disposed, and it is possible to suppress the predetermined or more floating of the document after mounting.

In the second to fourth embodiments, the biasing portion can use another spring such as a tension spring or a compression spring, instead of the torsion coil springs. Furthermore, it is also possible to use an elastic member such as rubber which can assign the biasing force to the second edge guide.

The pair of guide units configuring the guide mechanism 17 may be the combination of different types of the pair of guide units in the first to fourth embodiments.

In the above-described first embodiment, the pressing member is provided to be slide-movable in the width direction X instead of the movement by the rotation, and the pressing portion 31 may be configured to be movable between the pressing position of the upper portion of the mounting area and the retracting position deviated from the upper portion of the mounting area by the slide. If the movement of the pressing member is set as the rotation, it may be a rotational direction that the rotation shaft is orthogonal to the mounting surface 16A.

The pair of edge guides may be fixed to the mounting surface of the document mounting rack (for example, upper surface of tray portion). In other words, the pair of edge guides may be fixed to the mounting surface of the medium mounting rack in the processing apparatus in which only the medium of a constant width fixed in advance is the processing target.

The pair of edge guides may be configured such that one thereof is fixed, and the other thereof is slidable.

In the above-described first to fourth embodiments, the guide mechanism 17 includes the pair of guide units. However, the guide mechanism 17 may include one guide unit instead of the pair of guide units.

The medium mounting rack may be configured not to serve as the cover, instead of the configuration to serve as the cover. In this case, the medium mounting rack may be provided tiltably with respect to the main body, and may be fixed in a state of extending obliquely rearward upper side to form a predetermined angle with respect to the main body.

The document tray may be a portion of an automatic document feeding apparatus (auto sheet feeder) provided in the upper side of the cover of the document rack of the multi function peripheral.

In a case where the processing apparatus is the image reading apparatus, the processing apparatus may be a flat head type, without being limited to a sheet-feed type. In a case where the image reading apparatus is the flat head type, a movable carriage is provided along a sub-scanning direction (X direction) in the main body. The carriage is moved by a scanning motor as a power source to read the image of the document set on a glass plate of the document rack by the light source and the reading unit provided on the carriage. In the image reading apparatus with the flat head type of this type, there is the apparatus provided with the automatic document feeding apparatus (auto sheet feeder) to feed automatically the document. On the document mounting rack to set the document in the automatic document feeding apparatus, it may be provided with the pair of guide units with a floating prevention function in each of the embodiment.

The processing apparatus, as the processing mechanism, is not limited to the image reading apparatus (scanner apparatus) that includes the image reading processing mechanism (scan processing mechanism) to generate the image data by reading the image of the medium of the document in the main body. For example, it may be the apparatus to generate a product by transporting the medium such as the printing apparatus having the printing processing mechanism in the main body to generate the printed material by performing printing on the medium such as sheet as the processing mechanism, and the processing apparatus having the processing mechanism in the main body to generate the processed medium which is subjected to processing on the medium such as the sheet as the processing mechanism. It may be the transporting apparatus having the transport processing mechanism in the main body to transport the medium as the processing mechanism. In short, it may be the processing apparatus having the processing mechanism including a transport function capable of transporting (feeding) the medium disposed on the medium mounting rack to the apparatus main body.

According to one aspect of one embodiment, a processing apparatus includes a medium mounting rack that includes a mounting area in which a medium is disposed; an edge guide that is located at a side of the mounting area; a pressing member that includes a pressing portion and can move the pressing portion to a pressing position in an upper portion of the mounting area and to a retracting position away from the upper portion of the mounting area, independently from the edge guide; and a processing mechanism that performs processing including transport of the medium disposed in the mounting area.

According to the configuration, even in a state where the edge guide located at the side of the mounting area of the medium mounting rack is at a position capable of guiding (capable of positioning) the medium disposed on the mounting area, when the pressing member is moved independently from the edge guide, and the pressing portion is at the retracting position away from the upper portion of the mounting area, the medium can be disposed on the mounting area, without the pressing portion being the obstacle. When the pressing portion is at the pressing position in the upper portion of the mounting area, the medium disposed in the mounting area comes into contact with the pressing portion and more floating can be suppressed. When the processing mechanism is driven, the medium of which the floating is suppressed by the pressing portion, is transported (fed) from the mounting area into the main body while being guided by the edge guide. As a result, a skew is unlikely to be generated in the medium to be fed, and the medium is processed in a correct orientation by the processing mechanism without a rotational deviation by the skew. In this manner, the medium is preferably disposed in the mounting area.

In the above-described processing apparatus, in a case where the edge guide is set to be a first edge guide, it is preferable that the pressing member is a second edge guide that is located at the side of the mounting area, the second edge guide includes the pressing portion, and the pressing portion is moved to the pressing position and to the retracting position by the movement of the second edge guide.

According to the configuration, the second edge guide having the pressing portion is moved with respect to the first edge guide. Therefore, the pressing portion is moved to the pressing position and to the retracting position. By the first edge guide and the second edge guide when the pressing portion is located at the pressing position, the side end of both the sides in the width direction of the medium is guided, and a transport position of the medium is positioned.

In the above-described processing apparatus, in a case where the medium with a minimum dimension in a transport direction in which the processing mechanism performs the transport is disposed on the mounting area, it is preferable that the pressing portion is located at an upstream side of an upstream end of the medium with the minimum dimension, and the edge guide is located at the side of the medium with the minimum dimension.

According to the configuration, in a case the medium with the minimum dimension in the transport direction is disposed in the mounting area, the pressing portion is located at the upstream side of the upstream end of the medium with the minimum dimension, and the edge guide is located at the side of the medium with the minimum dimension. Therefore, even if the pressing portion is disposed at the pressing position, when the medium with the minimum dimension is disposed, the pressing portion is not the obstacle. The size of the mounting area of the medium with the minimum dimension can be adjusted by the edge guide.

In the above-described processing apparatus, in a state where the pressing portion is disposed at the pressing position, it is preferable that the first edge guide and the second edge guide at least partially overlap each other in a direction in which the first and second edge guides adjust the width of the mounting area according to the width of the document.

According to the configuration, in a state where the pressing portion is disposed at the pressing position, the first edge guide and the second edge guide at least partially overlap each other in the direction in which the first and second edge guides adjust the width of the mounting area. Therefore, the first edge guide and the second edge guide can be configured as a relatively thin type.

In the above-described processing apparatus, in a case of being viewed from a direction orthogonal to a surface of the mounting area, it is preferable that the second edge guide when the pressing portion is at the pressing position and the first edge guide at least partially overlap each other in a width direction in which a size of the mounting area is adjusted by the first edge guide and the second edge guide.

According to the configuration, in a case of being viewed from the direction orthogonal to the surface of the mounting area, the second edge guide when the pressing portion is at the pressing position and the first edge guide at least partially overlap each other in the width direction in which the size of the mounting area is adjusted by both of the edge guides. Therefore, in spite of having the first edge guide and the second edge guide, the guides can be configured as the relatively thin type.

In the above-described processing apparatus, it is preferable that in a state where one of the first edge guide and the second edge guide includes an opening, and the second edge guide is moved to a position to dispose the pressing portion at the pressing position, the other thereof is at least partially inserted into the opening.

According to the configuration, in a state where the second edge guide is moved to the position to dispose the pressing portion at the pressing position, one of the first edge guide and the second edge guide is at least partially inserted into the opening that the other thereof includes. Therefore, the first edge guide and the second edge guide can be configured as the relatively thin type.

In the above-described processing apparatus, it is preferable that the first edge guide and the second edge guide are disposed to be opened and closed in a closing position to fall into the mounting surface of the medium mounting rack and an opening position to be raised with respect to the mounting surface.

According to the configuration, the first edge guide and the second edge guide can be used as the edge guide by being disposed at the opening position to be raised with respect to the mounting surface. When not in use, the first edge guide and the second edge guide can be accommodated compactly by being tilted to the closing position.

In the above-described processing apparatus, it is preferable that a mechanism for interlocking the movement of the first edge guide and the second edge guide between the closing position and the opening position is further included.

According to the configuration, since the movement of the first edge guide and the second edge guide between the closing position and the opening position is interlocked, it is not necessary to operate the first edge guide and the second edge guide one by one. For this reason, the positioning work of the medium is easily performed.

In the above-described processing apparatus, it is preferable that the pressing portion is moved from the pressing position to the retracting position by force received from the medium when the medium is disposed on the medium mounting rack.

According to the configuration, the pressing portion is moved from the pressing position to the retracting position by the force received from the medium when the medium is disposed on the medium mounting rack. Therefore, when the medium is disposed, the pressing portion is not the obstacle.

In the above-described processing apparatus, it is preferable that a biasing portion that biases the pressing portion in a direction toward the pressing position from the retracting position is included.

According to the configuration, when the disposed medium is passed through and the force from the medium is no longer received, the pressing portion moved from the pressing position to the retracting position by the force received from the medium when the medium is disposed on the medium mounting rack, is moved from the retracting position to the pressing position by the biasing force of the biasing portion. Therefore, the floating of the medium disposed on the medium mounting rack is regulated by the pressing portion at the pressing position. For this reason, the user does not need to perform an operation to return the pressing portion which is moved from the pressing position to the retracting position when the medium is disposed, from the retracting position to the pressing position.

In the above-described processing apparatus, it is preferable that in the pressing portion, the surface facing the mounting surface of the medium mounting rack is a regulation surface to regulate floating of the medium from the mounting surface and a surface opposite to the regulation surface at least partially is an inclined surface that is inclined in the orientation closer to the mounting surface as closer to the center of the mounting area.

According to the configuration, the surface opposite to the regulation surface facing the mounting surface of the pressing portion at least partially is the inclined surface that is inclined in the orientation closer to the mounting surface as closer to the center of the mounting area. Therefore, in the process of mounting the medium along the edge guide, the medium comes into contact with the inclined surface of the pressing portion, and the pressing portion retracts from the pressing position to the retracting position by the force the inclined surface receives from the medium. Therefore, when the medium is disposed on the medium mounting rack, the pressing portion is not the obstacle.

In the above-described processing apparatus, it is preferable that in the pressing portion, the regulation surface is a surface parallel to the mounting surface of the medium mounting rack and a portion where the medium comes into contact with the pressing portion when the medium is disposed along the edge guide is at least partially the inclined surface. Being parallel is not limited to being exactly parallel. The lower surface of the pressing portion may be the surface extending along the mounting surface with an interval to the mounting surface of the medium mounting rack.

According to the configuration, the portion where the medium comes into contact with the pressing portion when the medium is disposed along the edge guide is at least partially the inclined surface. Therefore, in the process of moving the medium along the edge guide, the pressing portion retracts from the pressing position to the retracting position by the force the inclined surface receives from the medium. Therefore, when the medium is disposed on the medium mounting rack, the pressing portion is not the obstacle General Interpretation of Terms In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A processing apparatus comprising:
a medium mounting rack including a mounting area on which a medium is configured to be disposed;
a processing mechanism configured to perform a processing including transporting of the medium disposed in the mounting area in a transport direction; and
a guide unit including
a first edge guide located at a side of the mounting area in a width direction, and
a second edge guide located at the side of the mounting area, the second edge guide including a pressing portion, and configured to move the pressing portion to a pressing position in which the pressing portion overlaps the mounting area as viewed in a perpendicular direction perpendicular to the transport direction and the width direction, and move the pressing portion to a retracting position away from the mounting area, the pressing portion being movable independently from the first edge guide, the pressing portion being configured to be moved to the pressing position and to the retracting position by a movement of the second edge guide.

2. The processing apparatus according to claim 1, wherein while the medium with a minimum dimension in the transport direction is disposed on the mounting area, the pressing portion is located at an upstream side relative to an upstream end of the medium with the minimum dimension in the transport direction, and the first and second edge guides are located at a side of the medium with the minimum dimension.

3. The processing apparatus according to claim 2, wherein the medium with the minimum dimension is the medium which has the smallest size in the transport direction among sizes of the medium in the transport direction, which are usable for the processing apparatus.

4. The processing apparatus according to claim 1, wherein while the pressing portion is in the pressing position, the first edge guide and the second edge guide at least partially overlap each other in the width direction in which the first and second edge guides are configured to adjust a width of the mounting area according to a width of the medium.

5. The processing apparatus according to claim 4, wherein one of the first edge guide and the second edge guide includes an opening, and while the pressing portion of the second edge guide is in the pressing position, the other thereof is at least partially inserted into the opening.

6. The processing apparatus according to claim 1, wherein as viewed from the perpendicular direction orthogonal to a surface of the mounting area, the second edge guide while the pressing portion is in the pressing position and the first edge guide at least partially overlap each other in the width direction in which the first and second edge guides are configured to adjust a size of the mounting area.

7. The processing apparatus according to claim 1, wherein the first edge guide and the second edge guide are configured to be opened and closed and move between a closing position to fall into a mounting surface of the medium mounting rack and an opening position to be raised with respect to the mounting surface.

8. The processing apparatus according to claim 7, further comprising
a mechanism configured to interlock movement of the first edge guide and the second edge guide between the closing position and the opening position.

9. The processing apparatus according to claim 1, wherein the pressing portion is arranged so as to be positioned at an upstream side in the transport direction relative to an upstream end of the medium that has a predetermined dimension in the transport direction while the medium is disposed on the mounting area, and the first and second edge guides are located at a side of the medium in the width direction.

10. The processing apparatus according to claim 1, further comprising
a biasing portion configured to bias the pressing portion in a biasing direction toward the pressing position from the retracting position.

11. The processing apparatus according to claim 10, wherein the pressing portion is configured to be moved from the pressing position to the retracting position by receiving force, which exceeds a biasing force in the biasing direction of the biasing portion, from the medium while the medium is disposed on the medium mounting rack.

12. The processing apparatus according to claim 1, wherein the pressing portion includes a regulation surface that faces a mounting surface of the medium mounting rack and is configured to regulate floating of the medium from the mounting surface and an inclined surface that is opposite to the regulation surface and is inclined so as to be closer to the mounting surface as approaching to a center of the mounting area.

13. The processing apparatus according to claim 12, wherein the regulation surface is parallel to the mounting surface of the medium mounting rack, and the inclined surface is a portion which the medium is configured to at least partially come into contact with while the medium is disposed along the edge guide.

14. The processing apparatus according to claim 12, further comprising
a biasing portion configured to bias the pressing portion in a direction toward the pressing position from the retracting position.

15. A processing apparatus comprising:
a medium mounting rack including a mounting area on which a medium is configured to be disposed;
a processing mechanism configured to perform a processing including transporting of the medium disposed in the mounting area in a transport direction;
a guide unit including
an edge guide located at a side of the mounting area in a width direction, and
a pressing member including a pressing portion, and configured to move the pressing portion to a pressing position in which the pressing portion overlaps the mounting area as viewed in a perpendicular direction perpendicular to the transport direction and the width direction, and move the pressing portion to a retracting position away from the mounting area, the pressing portion being movable independently from the edge guide; and
a biasing portion configured to bias the pressing portion in a biasing direction toward the pressing position from the retracting position.

16. The processing apparatus according to claim 15, wherein the pressing portion is configured to be moved from the pressing position to the retracting position by receiving force, which exceeds a biasing force in the biasing direction of the biasing portion, from the medium while the medium is disposed on the medium mounting rack.

17. A processing apparatus comprising:
a medium mounting rack including a mounting area on which a medium is configured to be disposed;
a processing mechanism configured to perform a processing including transporting of the medium disposed in the mounting area in a transport direction; and
a guide unit including
an edge guide located at a side of the mounting area in a width direction,
a pressing member including a pressing portion, and configured to move the pressing portion to a pressing position in which the pressing portion overlaps the mounting area as viewed in a perpendicular direction perpendicular to the transport direction and the width direction, and move the pressing portion to a retracting position away from the mounting area, the pressing portion being movable independently from the edge guide, the pressing portion having a regulation surface that faces a mounting surface of the medium mounting rack and is configured to regulate floating of the medium from the mounting surface and an inclined surface that is opposite to the regulation surface and is inclined so as to be closer to the mounting surface as approaching to a center of the mounting area.

18. The processing apparatus according to claim 17, wherein the regulation surface is parallel to the mounting surface of the medium mounting rack, and the inclined surface is a portion which the medium is configured to at least partially come into contact with while the medium is disposed along the edge guide.

19. The processing apparatus according to claim 17, further comprising
a biasing portion configured to bias the pressing portion in a biasing direction toward the pressing position from the retracting position.

20. The processing apparatus according to claim 19, wherein the pressing portion is configured to be moved from the pressing position to the retracting position by receiving force, which exceeds a biasing force in the biasing direction of the biasing portion, from the medium while the medium is disposed on the medium mounting rack.

* * * * *